(12) United States Patent　　(10) Patent No.:　US 12,572,253 B2

Hlavac et al.　　(45) **Date of Patent:　\*Mar. 10, 2026**

(54) AUGMENT ORCHESTRATION IN AN ARTIFICIAL REALITY ENVIRONMENT

(71) Applicant: Meta Platforms Technologies, LLC, Menlo Park, CA (US)

(72) Inventors: Michal Hlavac, Seattle, WA (US); Benjamin Taylor Winn, Kent, WA (US); Wai Leong Chak, Bellevue, WA (US); Jasper Stevens, London (GB); Alexander Michael Louie, Milpitas, CA (US)

(73) Assignee: Meta Platforms Technologies, LLC, Menlo Park, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/540,102

(22) Filed: Dec. 14, 2023

(65) Prior Publication Data

US 2024/0126406 A1　　Apr. 18, 2024

Related U.S. Application Data

(63) Continuation of application No. 17/745,319, filed on May 16, 2022, now Pat. No. 11,928,308, which is a (Continued)

(51) Int. Cl.
*G06F 17/00*　　(2019.01)
*G06F 3/01*　　(2006.01)
(Continued)

(52) U.S. Cl.
CPC .......... *G06F 3/04815* (2013.01); *G06F 3/017* (2013.01); *G06F 16/9536* (2019.01); *G06T 19/006* (2013.01); *G06T 19/20* (2013.01)

(58) Field of Classification Search
CPC .. G06F 3/04815; G06F 3/017; G06F 16/9536; G06F 3/011; G06F 3/0346; G06T 19/006; G06T 19/20; G06Q 50/01
See application file for complete search history.

(56) References Cited

U.S. PATENT DOCUMENTS

| | | | |
|---|---|---|---|
| 770,149 | A | 9/1904 | Bailey |
| 6,748,420 | B1 | 6/2004 | Quatrano et al. |

(Continued)

FOREIGN PATENT DOCUMENTS

| | | |
|---|---|---|
| CN | 112424870 A | 2/2021 |
| CN | 118732838 A | 10/2024 |

(Continued)

OTHER PUBLICATIONS

Advisory Action mailed Oct. 13, 2021 for U.S. Appl. No. 16/567,563, filed Sep. 11, 2019, 3 pages.

(Continued)

*Primary Examiner* — Laurie A Ries

(74) *Attorney, Agent, or Firm* — Greenberg Traurig, LLP

(57) ABSTRACT

Aspects of the present disclosure are directed to an artificial reality system orchestrating interactions between virtual object "augments." The orchestration can include linking, which can be forming two or more augments into a combination, embedding an augment within an existing combination, or triggering an action mapped to the linking of those augments. Another type of orchestration can include extracting, which can refer to taking an augment out of an existing combination, either by removing it from the combination or copying the augment to leave a version in the combination and having another version outside the combination.

20 Claims, 22 Drawing Sheets

Related U.S. Application Data continuation of application No. 17/131,563, filed on Dec. 22, 2020, now Pat. No. 11,409,405.

(51) Int. Cl.

| | |
|---|---|
| *G06F 3/04815* | (2022.01) |
| *G06F 16/9536* | (2019.01) |
| *G06T 19/00* | (2011.01) |
| *G06T 19/20* | (2011.01) |

(56) References Cited

U.S. PATENT DOCUMENTS

| | | | |
|---|---|---|---|
| 6,842,175 B1 | 1/2005 | Schmalstieg et al. | |
| 6,842,877 B2 | 1/2005 | Robarts et al. | |
| 7,395,534 B2 | 7/2008 | Alcazar et al. | |
| 7,650,575 B2 | 1/2010 | Cummins et al. | |
| 7,701,439 B2 | 4/2010 | Hillis et al. | |
| 8,335,991 B2 | 12/2012 | Douceur et al. | |
| 8,368,640 B2 | 2/2013 | Dardinski et al. | |
| 8,558,759 B1 | 10/2013 | Prada Gomez et al. | |
| 8,726,233 B1 | 5/2014 | Raghavan | |
| 8,930,940 B2 | 1/2015 | Xu et al. | |
| 8,947,351 B1 | 2/2015 | Noble | |
| 8,947,427 B2 | 2/2015 | Shuster et al. | |
| 9,055,404 B2 | 6/2015 | Setlur et al. | |
| 9,081,177 B2 | 7/2015 | Wong et al. | |
| 9,117,274 B2 | 8/2015 | Liao et al. | |
| 9,129,404 B1 | 9/2015 | Wagner | |
| 9,292,089 B1 | 3/2016 | Sadek | |
| 9,424,239 B2 | 8/2016 | Dunn et al. | |
| 9,443,353 B2 | 9/2016 | Vaddadi et al. | |
| 9,477,368 B1 | 10/2016 | Filip et al. | |
| 9,478,030 B1 | 10/2016 | Lecky | |
| 9,530,252 B2 | 12/2016 | Poulos et al. | |
| 9,607,422 B1 | 3/2017 | Leedom | |
| 9,658,737 B2 | 5/2017 | Rothenberger et al. | |
| 9,817,472 B2 | 11/2017 | Lee et al. | |
| 9,870,716 B1 | 1/2018 | Rao et al. | |
| 9,881,420 B2 * | 1/2018 | Miller | G06T 19/006 |
| 9,922,462 B2 | 3/2018 | Miller | |
| 10,013,625 B1 | 7/2018 | Ahammad et al. | |
| 10,015,503 B1 | 7/2018 | Ahammad | |
| 10,220,303 B1 | 3/2019 | Schmidt et al. | |
| 10,248,284 B2 | 4/2019 | Itani et al. | |
| 10,319,154 B1 | 6/2019 | Chakravarthula et al. | |
| 10,335,572 B1 | 7/2019 | Kumar | |
| 10,402,647 B2 | 9/2019 | Schuh | |
| 10,473,935 B1 | 11/2019 | Gribetz et al. | |
| 10,521,944 B2 | 12/2019 | Sareen et al. | |
| 10,551,993 B1 | 2/2020 | Sanocki et al. | |
| 10,715,851 B1 | 7/2020 | Shankar et al. | |
| 10,783,714 B2 | 9/2020 | Diament et al. | |
| 10,799,792 B2 | 10/2020 | Rios | |
| 10,803,663 B2 | 10/2020 | Wang et al. | |
| 10,803,862 B2 | 10/2020 | Jang et al. | |
| 10,841,292 B2 | 11/2020 | Soon-Shiong | |
| 10,902,679 B2 | 1/2021 | Molyneaux et al. | |
| 10,909,762 B2 | 2/2021 | Karalis et al. | |
| 10,950,034 B1 | 3/2021 | Garcia et al. | |
| 10,963,144 B2 | 3/2021 | Fox et al. | |
| 10,996,915 B2 | 5/2021 | Kim | |
| 11,009,716 B2 | 5/2021 | Kiemele et al. | |
| 11,017,609 B1 | 5/2021 | Buzzerio et al. | |
| 11,064,047 B1 | 7/2021 | Stegall et al. | |
| 11,068,393 B2 | 7/2021 | Mandaleeka | |
| 11,100,812 B2 | 8/2021 | Daniel et al. | |
| 11,113,893 B1 | 9/2021 | Ma et al. | |
| 11,126,320 B1 | 9/2021 | Thompson et al. | |
| 11,132,052 B2 * | 9/2021 | Baumbach | G06F 3/011 |
| 11,170,576 B2 | 11/2021 | Ravasz et al. | |
| 11,176,755 B1 | 11/2021 | Tichenor et al. | |
| 11,178,376 B1 * | 11/2021 | Tichenor | G02B 27/0172 |
| 11,216,152 B2 | 1/2022 | Alexander | |
| 11,227,445 B1 * | 1/2022 | Tichenor | G06Q 30/0643 |
| 11,238,664 B1 | 2/2022 | Tavakoli et al. | |

| | | | |
|---|---|---|---|
| 11,256,341 B1 * | 2/2022 | Kin | A63F 13/211 |
| 11,270,513 B2 | 3/2022 | Yerli | |
| 11,270,522 B1 | 3/2022 | Tauber et al. | |
| 11,307,647 B2 | 4/2022 | Bond et al. | |
| 11,409,405 B1 | 8/2022 | Hlavac et al. | |
| 11,417,054 B1 | 8/2022 | Tanner et al. | |
| 11,433,304 B2 | 9/2022 | Fish et al. | |
| 11,467,656 B2 * | 10/2022 | Spivack | G06V 20/20 |
| 11,521,361 B1 | 12/2022 | Taguchi et al. | |
| 11,593,997 B2 | 2/2023 | Smith et al. | |
| 11,636,655 B2 | 4/2023 | Ma et al. | |
| 11,651,573 B2 | 5/2023 | Tichenor et al. | |
| 11,676,348 B2 | 6/2023 | Simpson et al. | |
| 11,720,167 B2 | 8/2023 | Bond et al. | |
| 11,748,944 B2 | 9/2023 | Karadayi et al. | |
| 11,762,952 B2 | 9/2023 | Hlavac et al. | |
| 11,769,304 B2 | 9/2023 | Tichenor et al. | |
| 11,798,247 B2 | 10/2023 | Karadayi et al. | |
| 11,847,753 B2 | 12/2023 | Tichenor et al. | |
| 11,928,308 B2 | 3/2024 | Hlavac et al. | |
| 11,935,208 B2 | 3/2024 | Karadayi et al. | |
| 12,130,998 B1 | 10/2024 | Roben | |
| 2003/0038805 A1 | 2/2003 | Wong et al. | |
| 2003/0106063 A1 | 6/2003 | Guedalia | |
| 2004/0237082 A1 | 11/2004 | Alcazar et al. | |
| 2005/0018216 A1 | 1/2005 | Barsness et al. | |
| 2008/0089587 A1 | 4/2008 | Kim et al. | |
| 2008/0092111 A1 | 4/2008 | Kinnucan et al. | |
| 2009/0006937 A1 | 1/2009 | Knapp et al. | |
| 2009/0063381 A1 | 3/2009 | Chan et al. | |
| 2009/0106234 A1 | 4/2009 | Siedlecki et al. | |
| 2009/0164913 A1 | 6/2009 | Davar et al. | |
| 2009/0199128 A1 | 8/2009 | Matthews et al. | |
| 2009/0307623 A1 | 12/2009 | Agarawala et al. | |
| 2009/0313299 A1 | 12/2009 | Bonev et al. | |
| 2010/0251177 A1 | 9/2010 | Geppert et al. | |
| 2010/0306716 A1 | 12/2010 | Perez | |
| 2011/0185043 A1 | 7/2011 | Zeller et al. | |
| 2011/0267265 A1 | 11/2011 | Stinson | |
| 2012/0069168 A1 | 3/2012 | Huang et al. | |
| 2012/0143358 A1 | 6/2012 | Adams et al. | |
| 2012/0188279 A1 | 7/2012 | Demaine | |
| 2012/0206345 A1 | 8/2012 | Langridge | |
| 2012/0218301 A1 | 8/2012 | Miller | |
| 2012/0249741 A1 | 10/2012 | Maciocci et al. | |
| 2012/0275686 A1 | 11/2012 | Wilson et al. | |
| 2012/0293544 A1 | 11/2012 | Miyamoto et al. | |
| 2013/0051615 A1 | 2/2013 | Lim et al. | |
| 2013/0063345 A1 | 3/2013 | Maeda | |
| 2013/0069860 A1 | 3/2013 | Davidson | |
| 2013/0076788 A1 | 3/2013 | Ben Zvi | |
| 2013/0083173 A1 | 4/2013 | Geisner et al. | |
| 2013/0117688 A1 | 5/2013 | Yerli | |
| 2013/0125066 A1 | 5/2013 | Klein et al. | |
| 2013/0141419 A1 * | 6/2013 | Mount | G09G 3/003 |
| | | | 345/419 |
| 2013/0147793 A1 | 6/2013 | Jeon et al. | |
| 2013/0169682 A1 | 7/2013 | Novak et al. | |
| 2013/0254884 A1 | 9/2013 | Dalcher et al. | |
| 2013/0265220 A1 | 10/2013 | Fleischmann et al. | |
| 2013/0293468 A1 | 11/2013 | Perez et al. | |
| 2013/0336629 A1 | 12/2013 | Mulholland et al. | |
| 2014/0075370 A1 | 3/2014 | Guerin et al. | |
| 2014/0114845 A1 | 4/2014 | Rogers et al. | |
| 2014/0125598 A1 | 5/2014 | Cheng et al. | |
| 2014/0149901 A1 | 5/2014 | Hunter | |
| 2014/0225922 A1 | 8/2014 | Sbardella | |
| 2014/0236996 A1 | 8/2014 | Masuko et al. | |
| 2014/0270494 A1 | 9/2014 | Sawhney et al. | |
| 2014/0357366 A1 | 12/2014 | Koganezawa et al. | |
| 2014/0375683 A1 | 12/2014 | Salter et al. | |
| 2014/0375691 A1 | 12/2014 | Kasahara | |
| 2015/0015504 A1 | 1/2015 | Lee et al. | |
| 2015/0035746 A1 | 2/2015 | Cockburn et al. | |
| 2015/0054742 A1 | 2/2015 | Imoto et al. | |
| 2015/0062160 A1 | 3/2015 | Sakamoto et al. | |
| 2015/0074506 A1 | 3/2015 | Dunn et al. | |
| 2015/0074742 A1 | 3/2015 | Kohno et al. | |
| 2015/0077592 A1 | 3/2015 | Fahey | |

(56) References Cited

U.S. PATENT DOCUMENTS

| | | |
|---|---|---|
| 2015/0123966 A1 | 5/2015 | Newman |
| 2015/0143302 A1 | 5/2015 | Chang et al. |
| 2015/0153833 A1 | 6/2015 | Pinault et al. |
| 2015/0160736 A1 | 6/2015 | Fujiwara |
| 2015/0169076 A1 | 6/2015 | Cohen et al. |
| 2015/0181679 A1 | 6/2015 | Liao et al. |
| 2015/0206321 A1 | 7/2015 | Scavezze et al. |
| 2015/0213371 A1 | 7/2015 | Nitz et al. |
| 2015/0220150 A1 | 8/2015 | Plagemann et al. |
| 2015/0243079 A1 | 8/2015 | Cho et al. |
| 2015/0253862 A1 | 9/2015 | Seo et al. |
| 2015/0261659 A1 | 9/2015 | Bader et al. |
| 2015/0269780 A1 | 9/2015 | Herman et al. |
| 2015/0302662 A1* | 10/2015 | Miller ............... G02B 27/0093 345/633 |
| 2015/0356774 A1 | 12/2015 | Gal et al. |
| 2016/0026253 A1 | 1/2016 | Bradski et al. |
| 2016/0063762 A1 | 3/2016 | Heuvel et al. |
| 2016/0110052 A1 | 4/2016 | Kim et al. |
| 2016/0133170 A1 | 5/2016 | Fateh |
| 2016/0147308 A1 | 5/2016 | Gelman et al. |
| 2016/0147408 A1 | 5/2016 | Bevis et al. |
| 2016/0170603 A1 | 6/2016 | Bastien et al. |
| 2016/0180590 A1 | 6/2016 | Kamhi et al. |
| 2016/0189386 A1 | 6/2016 | Michaelraj et al. |
| 2016/0260261 A1 | 9/2016 | Hsu |
| 2016/0378291 A1 | 12/2016 | Pokrzywka |
| 2017/0041388 A1 | 2/2017 | Tal et al. |
| 2017/0060230 A1 | 3/2017 | Faaborg et al. |
| 2017/0069134 A1 | 3/2017 | Shapira et al. |
| 2017/0075420 A1 | 3/2017 | Yu et al. |
| 2017/0076500 A1 | 3/2017 | Maggiore et al. |
| 2017/0084051 A1 | 3/2017 | Weising et al. |
| 2017/0099295 A1 | 4/2017 | Ricci |
| 2017/0109936 A1 | 4/2017 | Powderly et al. |
| 2017/0124230 A1 | 5/2017 | Liu et al. |
| 2017/0139478 A1 | 5/2017 | Jeon et al. |
| 2017/0192513 A1 | 7/2017 | Karmon et al. |
| 2017/0237789 A1 | 8/2017 | Harner et al. |
| 2017/0242675 A1 | 8/2017 | Deshmukh |
| 2017/0243465 A1 | 8/2017 | Bourne, Jr. et al. |
| 2017/0258526 A1 | 9/2017 | Lang |
| 2017/0262063 A1 | 9/2017 | Blénessy et al. |
| 2017/0278304 A1 | 9/2017 | Hildreth et al. |
| 2017/0287225 A1 | 10/2017 | Powderly et al. |
| 2017/0296363 A1 | 10/2017 | Yetkin et al. |
| 2017/0311129 A1 | 10/2017 | Lopez-Uricoechea et al. |
| 2017/0323488 A1 | 11/2017 | Mott et al. |
| 2017/0364198 A1 | 12/2017 | Yoganandan et al. |
| 2017/0372225 A1 | 12/2017 | Foresti |
| 2018/0005429 A1 | 1/2018 | Osman et al. |
| 2018/0007099 A1 | 1/2018 | Ein-Gil et al. |
| 2018/0059901 A1 | 3/2018 | Gullicksen |
| 2018/0082480 A1 | 3/2018 | White et al. |
| 2018/0095616 A1 | 4/2018 | Valdivia et al. |
| 2018/0095635 A1 | 4/2018 | Valdivia et al. |
| 2018/0095636 A1 | 4/2018 | Valdivia et al. |
| 2018/0096507 A1 | 4/2018 | Valdivia et al. |
| 2018/0096519 A1 | 4/2018 | Tokubo |
| 2018/0098059 A1 | 4/2018 | Valdivia et al. |
| 2018/0107278 A1 | 4/2018 | Goel et al. |
| 2018/0113599 A1 | 4/2018 | Yin |
| 2018/0158134 A1 | 6/2018 | Hassan |
| 2018/0189568 A1 | 7/2018 | Powderly et al. |
| 2018/0189647 A1 | 7/2018 | Calvo et al. |
| 2018/0300557 A1 | 10/2018 | Rodenas et al. |
| 2018/0307303 A1 | 10/2018 | Powderly et al. |
| 2018/0314484 A1 | 11/2018 | Pahud et al. |
| 2018/0315162 A1 | 11/2018 | Sturm et al. |
| 2018/0322701 A1 | 11/2018 | Pahud et al. |
| 2018/0323972 A1 | 11/2018 | Reed et al. |
| 2018/0335925 A1 | 11/2018 | Hsiao et al. |
| 2018/0350144 A1 | 12/2018 | Rathod |
| 2018/0357780 A1 | 12/2018 | Young et al. |
| 2018/0365897 A1 | 12/2018 | Pahud et al. |
| 2019/0005724 A1 | 1/2019 | Pahud et al. |
| 2019/0018498 A1 | 1/2019 | West et al. |
| 2019/0043259 A1 | 2/2019 | Wang et al. |
| 2019/0094981 A1 | 3/2019 | Bradski et al. |
| 2019/0096131 A1 | 3/2019 | Crews et al. |
| 2019/0107894 A1 | 4/2019 | Hebbalaguppe et al. |
| 2019/0107991 A1* | 4/2019 | Spivack ................... G09G 5/14 |
| 2019/0108578 A1 | 4/2019 | Spivack et al. |
| 2019/0108682 A1 | 4/2019 | Spivack et al. |
| 2019/0114061 A1 | 4/2019 | Daniels et al. |
| 2019/0130656 A1 | 5/2019 | Gebbie et al. |
| 2019/0130788 A1 | 5/2019 | Seaton |
| 2019/0155481 A1 | 5/2019 | DiVerdi et al. |
| 2019/0163700 A1 | 5/2019 | Baumgardner et al. |
| 2019/0172262 A1 | 6/2019 | McHugh et al. |
| 2019/0197785 A1 | 6/2019 | Tate-Gans et al. |
| 2019/0212827 A1 | 7/2019 | Kin et al. |
| 2019/0213792 A1 | 7/2019 | Jakubzak et al. |
| 2019/0221035 A1 | 7/2019 | Clark et al. |
| 2019/0235729 A1 | 8/2019 | Day et al. |
| 2019/0237044 A1 | 8/2019 | Day et al. |
| 2019/0258318 A1 | 8/2019 | Qin et al. |
| 2019/0278376 A1 | 9/2019 | Kutliroff et al. |
| 2019/0278432 A1 | 9/2019 | Bennett et al. |
| 2019/0279424 A1 | 9/2019 | Clausen et al. |
| 2019/0279426 A1 | 9/2019 | Musunuri et al. |
| 2019/0286231 A1 | 9/2019 | Burns et al. |
| 2019/0294721 A1 | 9/2019 | Keifer et al. |
| 2019/0294889 A1 | 9/2019 | Sriram et al. |
| 2019/0340799 A1 | 11/2019 | Dryer et al. |
| 2019/0340833 A1 | 11/2019 | Furtwangler et al. |
| 2019/0362562 A1 | 11/2019 | Benson |
| 2019/0369391 A1 | 12/2019 | Cordesses et al. |
| 2019/0371060 A1 | 12/2019 | Energin et al. |
| 2019/0371279 A1 | 12/2019 | Mak |
| 2019/0377406 A1 | 12/2019 | Steptoe et al. |
| 2019/0377416 A1 | 12/2019 | Alexander |
| 2019/0377487 A1 | 12/2019 | Bailey et al. |
| 2019/0377538 A1 | 12/2019 | Jones et al. |
| 2019/0385371 A1 | 12/2019 | Joyce et al. |
| 2020/0013211 A1 | 1/2020 | Bergen et al. |
| 2020/0042108 A1 | 2/2020 | Wan |
| 2020/0065584 A1 | 2/2020 | Iyer et al. |
| 2020/0066047 A1 | 2/2020 | Karalis et al. |
| 2020/0082629 A1 | 3/2020 | Jones et al. |
| 2020/0097077 A1 | 3/2020 | Nguyen et al. |
| 2020/0097091 A1 | 3/2020 | Chou et al. |
| 2020/0111256 A1 | 4/2020 | Bleyer et al. |
| 2020/0151965 A1 | 5/2020 | Forbes et al. |
| 2020/0218423 A1 | 7/2020 | Ohashi |
| 2020/0219319 A1 | 7/2020 | Lashmar et al. |
| 2020/0225736 A1 | 7/2020 | Schwarz et al. |
| 2020/0225758 A1 | 7/2020 | Tang et al. |
| 2020/0226814 A1 | 7/2020 | Tang et al. |
| 2020/0226823 A1 | 7/2020 | Stachniak et al. |
| 2020/0241300 A1 | 7/2020 | Robinson et al. |
| 2020/0242842 A1 | 7/2020 | Fukazawa et al. |
| 2020/0279386 A1 | 9/2020 | Da Veiga |
| 2020/0279429 A1 | 9/2020 | Upadhyay et al. |
| 2020/0285761 A1 | 9/2020 | Buck et al. |
| 2020/0289934 A1 | 9/2020 | Azmandian et al. |
| 2020/0312028 A1 | 10/2020 | Charvat et al. |
| 2020/0334908 A1 | 10/2020 | Wilson et al. |
| 2020/0342673 A1 | 10/2020 | Lohr et al. |
| 2020/0351273 A1 | 11/2020 | Thomas |
| 2020/0363924 A1 | 11/2020 | Flexman et al. |
| 2020/0363930 A1 | 11/2020 | Srinivasan et al. |
| 2020/0368616 A1 | 11/2020 | Delamont |
| 2020/0375666 A1 | 12/2020 | Murphy |
| 2020/0394935 A1 | 12/2020 | Ray et al. |
| 2020/0402320 A1 | 12/2020 | Crews et al. |
| 2021/0012113 A1 | 1/2021 | Petill et al. |
| 2021/0014408 A1 | 1/2021 | Timonen et al. |
| 2021/0026441 A1* | 1/2021 | Spivack ............. G06Q 30/0601 |
| 2021/0096726 A1 | 4/2021 | Faulkner et al. |
| 2021/0097768 A1 | 4/2021 | Malia et al. |
| 2021/0103449 A1 | 4/2021 | Terpstra et al. |
| 2021/0111890 A1 | 4/2021 | Reed et al. |
| 2021/0124821 A1 | 4/2021 | Spivak et al. |

(56) References Cited

U.S. PATENT DOCUMENTS

| | | |
|---|---|---|
| 2021/0125414 A1 | 4/2021 | Berkebile |
| 2021/0126823 A1 | 4/2021 | Poess et al. |
| 2021/0158608 A1 | 5/2021 | Boggs et al. |
| 2021/0183114 A1 | 6/2021 | Corson |
| 2021/0191600 A1 | 6/2021 | Lemay et al. |
| 2021/0192856 A1 | 6/2021 | Lee |
| 2021/0272375 A1 | 9/2021 | Lashmar et al. |
| 2021/0295602 A1 | 9/2021 | Scapel et al. |
| 2021/0306238 A1 | 9/2021 | Cheng et al. |
| 2021/0322856 A1 | 10/2021 | Virkar et al. |
| 2021/0373741 A1 | 12/2021 | Agarawala et al. |
| 2021/0378768 A1 | 12/2021 | Olson et al. |
| 2021/0390765 A1 | 12/2021 | Laaksonen et al. |
| 2022/0038522 A1 | 2/2022 | Goolkasian et al. |
| 2022/0068035 A1 | 3/2022 | Tichenor et al. |
| 2022/0084279 A1 | 3/2022 | Lindmeier et al. |
| 2022/0091722 A1 | 3/2022 | Faulkner et al. |
| 2022/0100265 A1 | 3/2022 | Kies et al. |
| 2022/0100279 A1 | 3/2022 | Lee et al. |
| 2022/0101612 A1 | 3/2022 | Palangie et al. |
| 2022/0121344 A1 | 4/2022 | Pastrana Vicente et al. |
| 2022/0122329 A1 | 4/2022 | Tichenor et al. |
| 2022/0139052 A1 | 5/2022 | Tavakoli et al. |
| 2022/0161422 A1 | 5/2022 | Chen et al. |
| 2022/0211188 A1 | 7/2022 | Daub et al. |
| 2022/0261088 A1 | 8/2022 | Pinchon et al. |
| 2022/0276765 A1 | 9/2022 | Hlavac et al. |
| 2022/0318035 A1 | 10/2022 | Garstenauer et al. |
| 2022/0358715 A1 | 11/2022 | Tanner et al. |
| 2022/0406021 A1 | 12/2022 | LeBeau et al. |
| 2022/0414403 A1 | 12/2022 | Hlavac et al. |
| 2023/0004943 A1 | 1/2023 | Øhrn et al. |
| 2023/0016490 A1* | 1/2023 | Berkebile ............... G06F 3/011 |
| 2023/0022194 A1 | 1/2023 | Soryal |
| 2023/0056976 A1 | 2/2023 | Tanner et al. |
| 2023/0126837 A1 | 4/2023 | Karadayi et al. |
| 2023/0127438 A1 | 4/2023 | Karadayi et al. |
| 2023/0134355 A1 | 5/2023 | Lansel et al. |
| 2023/0152851 A1 | 5/2023 | Berliner et al. |
| 2023/0168737 A1 | 6/2023 | Pratt et al. |
| 2023/0169737 A1 | 6/2023 | Taguchi et al. |
| 2023/0196766 A1* | 6/2023 | Pla I Conesa ..... G06V 10/7715 |
| | | 382/190 |
| 2023/0215120 A1* | 7/2023 | Ma ........................... G06F 3/013 |
| | | 345/633 |
| 2023/0221797 A1 | 7/2023 | Louie et al. |
| 2023/0244755 A1 | 8/2023 | Hlavac et al. |
| 2023/0245386 A1 | 8/2023 | Karadayi et al. |
| 2023/0260000 A1 | 8/2023 | Belavy |
| 2023/0260233 A1* | 8/2023 | Goncalves .............. G06T 19/20 |
| | | 345/419 |
| 2023/0290089 A1 | 9/2023 | Simpson et al. |
| 2023/0367611 A1 | 11/2023 | Blakeley et al. |
| 2023/0384859 A1 | 11/2023 | Bond et al. |
| 2023/0410436 A1 | 12/2023 | Beauchamp et al. |
| 2023/0419616 A1 | 12/2023 | Dudovitch et al. |
| 2023/0419998 A1 | 12/2023 | Nguyen et al. |
| 2024/0045495 A1 | 2/2024 | Elhadad et al. |
| 2024/0061547 A1 | 2/2024 | Fleizach et al. |
| 2024/0095699 A1 | 3/2024 | Sinha et al. |
| 2024/0153205 A1 | 5/2024 | Huergo Wagner et al. |
| 2024/0233292 A1* | 7/2024 | Tichenor ............... G06T 19/006 |
| 2024/0250955 A1* | 7/2024 | Lebeau ................... G06V 20/20 |
| 2024/0264851 A1 | 8/2024 | Blakeley et al. |
| 2024/0288995 A1 | 8/2024 | Short et al. |
| 2024/0310992 A1 | 9/2024 | Wan et al. |
| 2024/0311498 A1 | 9/2024 | Millberg et al. |
| 2024/0312143 A1 | 9/2024 | Millberg et al. |
| 2024/0331278 A1 | 10/2024 | Arora et al. |
| 2024/0331287 A1 | 10/2024 | Karadayi et al. |
| 2024/0331312 A1 | 10/2024 | Freeman et al. |
| 2024/0331320 A1 | 10/2024 | Taguchi et al. |
| 2024/0338070 A1 | 10/2024 | Tanner et al. |
| 2024/0361837 A1 | 10/2024 | Louie et al. |
| 2024/0402869 A1 | 12/2024 | Boesel et al. |
| 2025/0036431 A1 | 1/2025 | Han et al. |
| 2025/0060812 A1 | 2/2025 | Bond et al. |
| 2025/0166322 A1 | 5/2025 | Simpson et al. |

FOREIGN PATENT DOCUMENTS

| | | |
|---|---|---|
| CN | 111095165 B | 11/2024 |
| EP | 2887322 B1 | 2/2020 |
| EP | 4439247 A1 | 10/2024 |
| EP | 4439248 A1 | 10/2024 |
| JP | 2016148968 A | 8/2016 |
| JP | WO2014097706 A1 | 1/2017 |
| JP | 2017536618 A | 12/2017 |
| JP | 2019101743 A | 6/2019 |
| JP | 2019527881 A | 10/2019 |
| JP | 2022147265 A | 10/2022 |
| WO | 2014097706 A1 | 6/2014 |
| WO | 2015192117 A1 | 12/2015 |
| WO | 2016041088 A1 | 3/2016 |
| WO | 2018235371 A1 | 12/2018 |
| WO | 2019143839 A1 | 7/2019 |
| WO | 2020159302 A1 | 8/2020 |
| WO | 2020226832 A1 | 11/2020 |
| WO | 2021163373 A1 | 8/2021 |
| WO | 2022055822 A1 | 3/2022 |
| WO | 2024039666 A1 | 2/2024 |
| WO | 2024086325 A1 | 4/2024 |

OTHER PUBLICATIONS

"App Clips," Apple Developer, 2022, 4 pages, Retrieved from the Internet: URL: https://developer.apple.com/app-clips/.

Final Office Action mailed Aug. 5, 2021 for U.S. Appl. No. 16/567,563, filed Sep. 11, 2019, 11 Pages.

"Google Play Instant," Retrieved on [Jan. 27, 2022], 2 pages, Retrieved from the Internet: URL: https://developer.android.com/topic/google-play-instant.

International Preliminary Report on Patentability for International Application No. PCT/US2020/045538, mailed Mar. 24, 2022, 9 pages.

International Preliminary Report on Patentability for International Application No. PCT/US2022/032288, mailed Jan. 11, 2024, 10 pages.

International Preliminary Report on Patentability for International Application No. PCT/US2022/033338, mailed Jan. 11, 2024, 11 pages.

International Preliminary Report on Patentability for International Application No. PCT/US2022/040484, mailed Feb. 29, 2024, 9 pages.

International Search Report and Written Opinion for International Application No. PCT/US2020/045538, mailed Oct. 23, 2020, 11 Pages.

International Search Report and Written Opinion for International Application No. PCT/US2022/020292 mailed Aug. 17, 2022, 17 pages.

International Search Report and Written Opinion for International Application No. PCT/US2022/031840, mailed Sep. 13, 2022, 13 pages.

International Search Report and Written Opinion for International Application No. PCT/US2022/033338 mailed Sep. 6, 2022, 13 pages.

International Search Report and Written Opinion for International Application No. PCT/US2022/040484, mailed Nov. 25, 2022, 11 pages.

International Search Report and Written Opinion for International Application No. PCT/US2022/054413, mailed Jul. 7, 2023, 11 pages.

Non-Final Office Action mailed Dec. 8, 2022 for U.S. Appl. No. 17/659,431, filed Apr. 15, 2022, 12 pages.

Non-Final Office Action mailed Jan. 25, 2021 for U.S. Appl. No. 16/567,563, filed Sep. 11, 2019, 10 Pages.

Notice of Allowance mailed Dec. 21, 2021 for U.S. Appl. No. 16/567,563, filed Sep. 11, 2019, 6 pages.

(56)     References Cited

OTHER PUBLICATIONS

Notice of Allowance mailed Mar. 21, 2023 for U.S. Appl. No. 17/659,431, filed Apr. 15, 2022, 5 pages.
Office Action mailed Aug. 21, 2023 for Chinese Application No. 202080054473.3, filed Aug. 8, 2020, 7 pages.
Office Action mailed Feb. 26, 2024 for European Patent Application No. 20761419.9, filed on Aug. 8, 2020, 7 pages.
Prosecution History of U.S. Appl. No. 16/567,563 dated Jan. 25, 2021, through Dec. 21, 2021, 52 pages.
Wikipedia: "Simultaneous Localization and Mapping," Jul. 25, 2017, 7 pages, Retrieved from the Internet: URL: https://en.wikipedia. org/w/index.php?title=Simultaneous_localization_and_mapping &oldid=731478358 [Retrieved on Oct. 23, 2017].
European Search Report for European Patent Application No. 24155337.9, dated Jul. 2, 2024, 7 pages.
European Search Report for European Patent Application No. 24156842.7, dated Jun. 25, 2024, 6 pages.
International Preliminary Report on Patentability for International Application No. PCT/US2022/045510, mailed May 10, 2024, 9 pages.
International Preliminary Report on Patentability for International Application No. PCT/US2022/053780, mailed Jul. 4, 2024, 9 pages.
Office Action mailed Jun. 25, 2024 for Japanese Patent Application No. 2021-577408, filed on Aug. 8, 2020, 4 pages.
Tatzgern M., et al., "Adaptive Information Density for Augmented Reality Displays," IEEE Virtual Reality Conference, Mar. 19-23, 2016, pp. 83-92.
Broitman A., "Learn and Do More with Lens in Google Images," Oct. 25, 2018, Retrieved from the Internet: URL: https://www.blog. google/products/search/learn-and-do-more-lens-google-images/, 4 pages.
Fleury C., et al., "A Generic Model for Embedding Users' Physical Workspaces into Multi-Scale Collaborative Virtual Environments," 20th International Conference on Artificial Reality and Telexistence, Dec. 3, 2010, 8 pages.
Hincapie-Ramos J.D., et al., "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.
International Preliminary Report on Patentability for International Application No. PCT/US2021/044098, mailed Mar. 9, 2023, 18 pages.
International Search Report and Written Opinion for International Application No. PCT/US2020/051763, mailed Feb. 3, 2021, 11 Pages.
International Search Report and Written Opinion for International Application No. PCT/US2022/032288, mailed Sep. 16, 2022, 11 pages.
International Search Report and Written Opinion for International Application No. PCT/US2022/045510, mailed Jan. 19, 2023, 10 pages.
International Search Report and Written Opinion for International Application No. PCT/US2022/053780, mailed Mar. 20, 2023, 10 pages.
International Search Report and Written Opinion for International Application No. PCT/US2023/021312, mailed Aug. 24, 2023, 15 pages.
Invitation to Pay Additional Fees for International Application No. PCT/US2021/044098, Nov. 3, 2021, 15 pages.
Mayer S., et al., "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.
Melnick K., "Google Rolls out New AR Features for Its Lens APP," May 28, 2019, Retrieved from the Internet: URL: https://vrscout. com/news/new-ar-features-google-lens/ , 3 pages.
Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.

Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.
Schweigert R., et al., "EyePointing: A Gaze-Based Selection Technique," Proceedings of Mensch and Computer, Hamburg, Germany, Sep. 8-11, 2019, pp. 719-723.
Unity Gets Toolkit for Common AR/VR Interactions, Unity XR interaction Toolkit Preview [Online], Dec. 19, 2019 Retrieved on Apr. 7, 2020], 1 page, Retrieved from the Internet: URL: http://youtu.be/ZPhv4qmT9EQ.
Vitzthum A., "SSIML/Behaviour: Designing Behaviour and Animation of Graphical Objects in Virtual Reality and Multimedia Applications," Proceedings of the Seventh IEEE International Symposium on Multimedia, Dec. 12, 2005, 9 pages.
Wikipedia, "Multiple-document Interface," May 8, 2022 [retrieved on 2023-008-16], 5 pages, Retrieved from the Internet: URL: https://web.archive.org/web/20220508091934/https://en.wikipedia.org/wiki/Multipledocument_interface.
European Search Report for European Patent Application No. 24155099.5, dated Aug. 5, 2024, 7 pages.
European Search Report for European Patent Application No. 24158455.6, dated Jun. 28, 2024, 6 pages.
International Preliminary Report on Patentability for International Application No. PCT/US2022/054413, mailed Jul. 25, 2024, 9 pages.
International Preliminary Report on Patentability for International Application No. PCT/US2023/021312, mailed Nov. 21, 2024, 14 pages.
European Search Report for European Patent Application No. 24159313.6, dated May 21, 2024, 6 pages.
Final Office Action mailed Jun. 11, 2025 for U.S. Appl. No. 18/194,221, filed Mar. 31, 2023, 19 pages.
Non-Final Office Action mailed May 22, 2025 for U.S. Appl. No. 18/183,597, filed Mar. 14, 2023, 23 pages.
Office Action mailed Mar. 4, 2025 for European Patent Application No. 22735726.6, filed on Jun. 1, 2022, 5 pages.
Virtus Learning Hub., "How To Use Virtual Reality In Unreal Engine 5 | Beginner Tutorial," Jul. 15, 2022, 3 pages, Retrieved from the Internet URL: https://www.youtube.com/watch?v=DiGh6MxDFds.
Office Action mailed Jul. 8, 2025 for Japanese Patent Application No. 2023-507458, filed on Jul. 31, 2021, 3 pages.
Office Action mailed Aug. 19, 2025 for Korean Application No. 10-2023-7007911, filed Jul. 31, 2021, 7 pages.
Non-Final Office Action mailed Jun. 30, 2025 for U.S. Appl. No. 18/183,607, filed Mar. 14, 2023, 19 pages.
Notice of Allowance mailed Jul. 16, 2025 for U.S. Appl. No. 18/194,207, filed Mar. 31, 2023, 16 pages.
Non-Final Office Action mailed Oct. 6, 2025 for U.S. Appl. No. 18/636,891, filed Apr. 16, 2024, 16 pages.
Non-Final Office Action mailed Aug. 8, 2025 for U.S. Appl. No. 18/738,681, filed Jun. 10, 2024, 15 pages.
Non-Final Office Action mailed Aug. 27, 2025 for U.S. Appl. No. 18/937,886, filed Nov. 5, 2024, 12 pages.
Notice of Allowance mailed Oct. 7, 2025 for U.S. Appl. No. 18/296,641, filed Apr. 6, 2023, 5 pages.
Office Action mailed Jun. 12, 2025 for Taiwan Application No. 111105638, filed Feb. 16, 2022, 8 pages.
Office Action mailed Mar. 13, 2025 for Korean Application No. 10-2022-7011363, filed Aug. 8, 2020, 12 pages.
Office Action mailed Sep. 16, 2025 for Japanese Patent Application No. 2023-545773, filed on Mar. 15, 2022, 5 pages.
Office Action mailed Mar. 18, 2025 for Japanese Application No. 2023-507458, filed on Jul. 31, 2021, 9 pages.
Office Action mailed Sep. 19, 2025 for European Patent Application No. 22740636.0, filed on Jun. 5, 2022, 8 pages.
Notice of Allowance mailed Oct. 22, 2025 for U.S. Appl. No. 18/296,641, filed Apr. 6, 2023, 2 pages.
Notice of Allowance mailed Nov. 12, 2025 for U.S. Appl. No. 18/194,207, filed Mar. 31, 2023, 16 pages.

(56)           References Cited

OTHER PUBLICATIONS

Notice of Allowance mailed Nov. 21, 2025 for U.S. Appl. No. 18/296,641, filed Apr. 6, 2023, 2 pages.

* cited by examiner 1300 (continued)

| | Album | Video | Model | Call | Feed | List | Song | Product |
|---|---|---|---|---|---|---|---|---|
| Person | View Share | Share | Share | Add to call | Share | Share | Share | Share |
| Group | View Share | Share | Share | Add to call | Share | Share | Share | Share |
| Event | Add to Event | Add to Event | Add | Share | Share | Share | Share | Share |
| Time | Time since | Time since | - | Duration | - | - | - | - |
| Message | - | - | - | Share | - | List+ | - | - |
| Chat | View Share | Share | Share | Add poeple | Share | Share | Share | Share |
| Post | - | - | - | Share | - | List+ | - | - |
| Place | Tag | Tag | - | Share | Add feed | Located | Located | Located |
| Photo | Add to Album | - | - | Share | - | - | - | - |
| Album | - | - | - | Share | - | - | - | - |
| Video | | Playlist | - | Share | - | - | - | - |
| Model | | | Scene | Share | - | - | - | - |
| Call (live) | | | | Group Call | Share | Share | Share | Share |
| Feed | | | | | Feed | List+ | - | - |
| List | | | | | | List | - | List |
| Song | | | | | | | Playlist | - |
| Product | | | | | | | | List |

AUGMENT ORCHESTRATION IN AN ARTIFICIAL REALITY ENVIRONMENT

CROSS-REFERENCE TO RELATED APPLICATION(S)

This application is a continuation of U.S. patent application Ser. No. 17/745,319, filed May 16, 2022, titled "Augment Orchestration in an Artificial Reality Environment," which is a continuation of U.S. patent application Ser. No. 17/131,563, filed Dec. 22, 2020, titled "Augment Orchestration in an Artificial Reality Environment," now U.S. Pat. No. 11,409,405 issued on Aug. 9, 2022, both of which are hereby incorporated by reference in their entirety.

TECHNICAL FIELD

The present disclosure is directed to a new mode of orchestrating interactions between augment virtual objects in an artificial reality environment.

BACKGROUND

Interaction with computing systems are often founded on a set of core concepts that define how users can interact with that computing system. For example, early operating systems provided textual interfaces to interact with a file directory. This was later built upon with the addition of "windowing" systems whereby levels in the file directory and executing applications were displayed in multiple windows, each allocated a portion of a 2D display that was populated with content selected for that window (e.g., all the files from the same level in the directory, a graphical user interface generated by an application, menus or controls for the operating system, etc.). As computing form factors decreased in size and added integrated hardware capabilities (e.g., cameras, GPS, wireless antennas, etc.) the core concepts again evolved, moving to an "app" focus where each app encapsulated a capability of the computing system.

Existing artificial reality (XR) systems provide models, such as 3D virtual objects and 2D panels, with which a user can interact in 3D space. Existing XR systems have generally backed these models by extending the app core computing concept. For example, a user can instantiate these models by activating an app and telling the app to create the model, and using the model as an interface back to the app. This approach generally requires simulating the types of interactions traditionally performed with mobile devices in the virtual space. This approach also generally requires continued execution of the app for the models to persist in the artificial reality environment.

BRIEF DESCRIPTION OF THE DRAWINGS

FIGS. 13A and 13B are conceptual diagrams each illustrating half of a table that cross-references augment types to specify a resulting type when augments are linked.

The techniques introduced here may be better understood by referring to the following Detailed Description in conjunction with the accompanying drawings, in which like reference numerals indicate identical or functionally similar elements.

DETAILED DESCRIPTION

Figure 1:
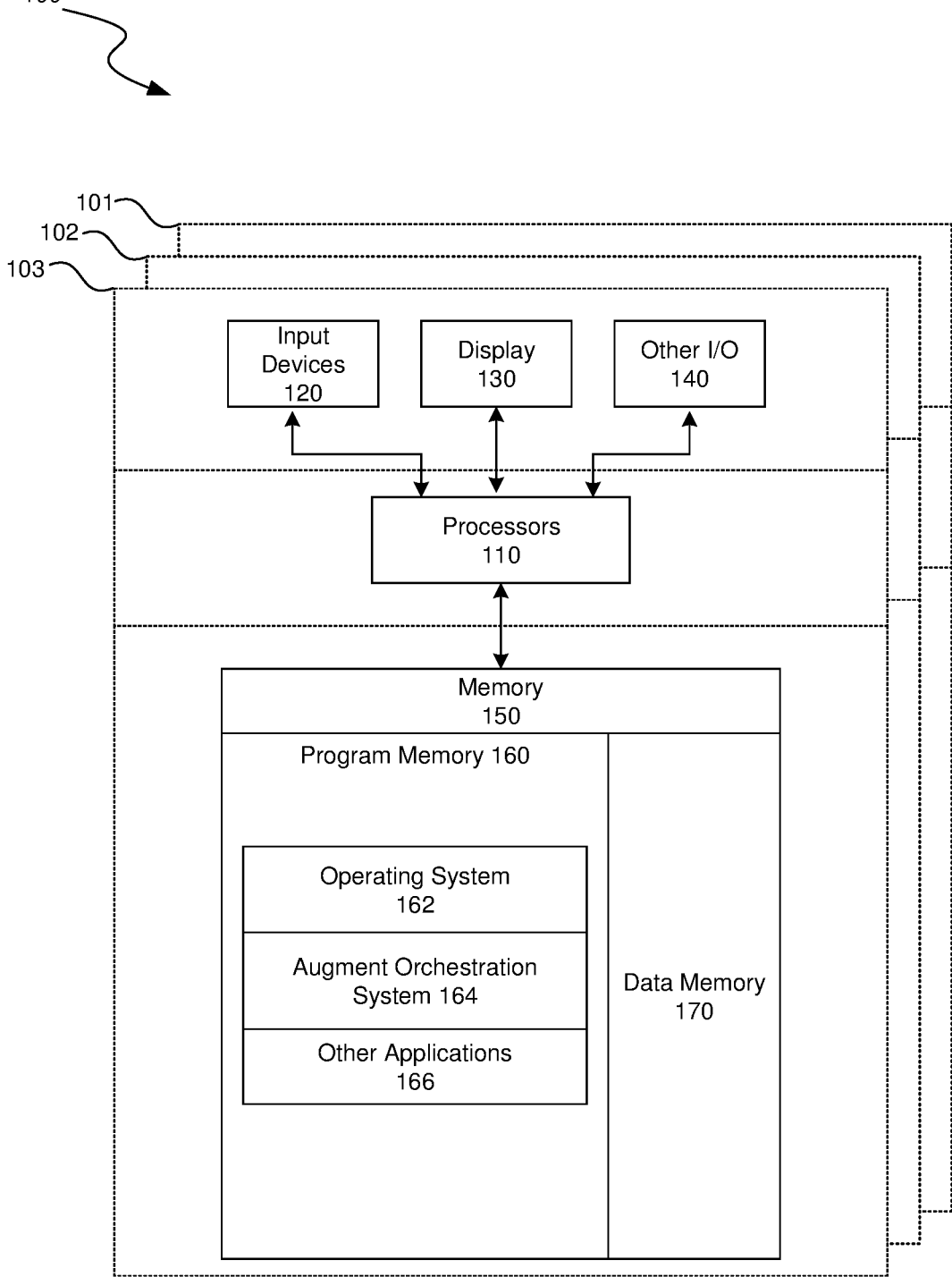
FIG. 1 is a block diagram illustrating an overview of devices on which some implementations of the present technology can operate.

Aspects of the present disclosure are directed to an artificial reality system orchestrating interactions between augments, such as creating combinations, causing linking actions, and extracting augments from a combination. An "augment" is a virtual object with a 2D or 3D volume in an artificial reality environment that can include presentation data, context, and logic. In some implementations, an artificial reality system can use augments as the fundamental building block for displaying 2D and 3D content in the artificial reality environment. For example, augments can represent people, places, and things in an artificial reality environment and can respond to a context such as a current display mode, date or time of day, a type of surface the augment is on, a relationship to other augments, etc. In some cases, an augment can correspond to a real-world object. For example, a screen augment can be a virtual object corresponding to a television. Augments can live on "surfaces" with context properties and layouts that cause the augments to be presented or act in different ways. A controlling application for the artificial reality system, sometimes referred to as a "shell," can control how artificial reality environment information is surfaced to users, what interactions can be performed, and what interactions are provided to applications. Augments and other objects (real or virtual) can also interact with each other, where these interactions can be mediated by the shell and are controlled by rules in the augments, evaluated based on contextual information from the shell. Additional details on augment creation and surfaces are provided in U.S. patent application Ser. No. 17/008,478, filed Aug. 31, 2020, which is herein incorporated by reference in its entirety.

Augments can interact through linking or extraction. "Linking," as used herein, refers to when augments are brought together to A) form a combination, B) embed an augment within an existing combination, or C) trigger an action mapped to the linking of those augments or those types of augments, without forming those augments into a combination. A combination resulting from linking two or more augments can itself also be an augment. "Extracting," as used herein, refers to A) taking an augment out of an existing combination, either by "peeling" the augment out (removing it from the combination) or copying the augment to leave a version in the combination and having another version outside the combination, or B) triggering an action mapped to taking an augment out of an existing combination. Together, linking and extracting are referred to herein as augment orchestration.

When linking two or more augments, rules can be applied to determine a result. These rules can be defined as properties of the augments or can be defined externally to the augments. For example, each augment can have a type and the result from the linking can be based on a lookup table that cross-references the augment types to a result. In various implementations, the result can specify a type for a resulting combination augment or a further rule to apply for the linking (e.g., causing actions the artificial reality system performs when these augments are linked). As another example, when two augments are linked, properties of each augment can be provided to the other (and/or other context from the artificial reality system, such as who is performing the linking, when the linking is occurring, where one augment was physically placed on another augment, what other real or virtual objects are in the artificial reality environment, etc.) and the augments can be programmed with rules specifying how to respond to linking with particular types or augments and/or in particular contexts. Additional details on augment linking are provided below in relation to FIGS. 5, 7-11, and 13.

In some implementations, augments can be linked in two ways: augments can be "linked in" another augment and augments can be "linked to" another augment. An augment is linked in another augment when there is reciprocal linking between the augments, i.e., each augment stores a link to the other augment. In some cases, an augment being linked in another augment causes the augments to form a combination (replacing the augments, in the artificial reality environment, with an augment representing both or removing one of the augments and updating the remaining augment to include an indication of the removed augment). For example, when a person augment is linked in an event augment, the person augment can be updated to have a reference to the event (e.g., "my events") and the event augment can be updated to include a reference to the person (e.g., "invitees"), the person augment can be removed from the artificial reality environment, and the event augment can show the person in an invitee list. An augment is linked to another augment when only one of the augments stores a link to the other augment. In some implementations, an augment being linked to another augment allows both augments to remain in the artificial reality environment. For example, when a weather indicator augment is linked in an event augment, the event augment may not have any rules for how to respond to this linking, so it takes no action. However, the weather augment may have a rule to link to the event and set its location and date properties to correspond to the location and date of the event. This in turn can cause the weather augment to update its display to show the predicted weather for the date and location of the event. Both augments can remain in the artificial reality environment. Additional details on augment "linking in" versus "linking to" are provided below in relation to FIG. 9.

In some cases, a combination can have multiple possible results and the artificial reality system can perform a disambiguation process to select which result to use. In some cases, this disambiguation can be based on mechanics of how a user indicated the linking. For example, parts of an augment can be defined as a "socket" corresponding to a particular sub-result that the artificial reality system is to use when an augment of a particular type is placed to intersect with that socket. As another example, linking can be asynchronous such that which augment was moved to be placed on the other can control which linking result is selected. In some implementations, the disambiguation includes providing options of the possible results to a user (e.g., in a dialog), allowing the user to select which result to use. In yet further implementations, the result of a previous disambiguation can be used to determine which result to use. For example, if a previous disambiguation process for augments of types X and Y included a user selecting result N, then when further linking of augments of types X and Y is performed by that user, result N can be automatically used. In such a case, a UI may be available for the user to undo the result N and select a different result. Additional details on disambiguation are provided below in relation to blocks 508 and 510 of FIG. 5 and FIGS. 11A and 11B.

An augment can be extracted from a combination by the user performing a gesture to pull the augment out of the combination. This can have one of two results: the augment can be peeled out of the combination or the augment can be copied with a version of the augment can staying in the combination and a version existing, in the artificial reality environment, outside the combination. The artificial reality system can determine which of these results occur based on whether a removal tool was activated prior to the gesture (or used in the gesture) to perform the extraction. Additional details on extraction are provided below in relation to FIGS. 6, 12A, and 12B.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Existing artificial reality systems provide app-focused precepts for presenting and interacting with virtual objects. However, these artificial reality systems provide limited functionality, simply mimicking the traditional user experience of using "apps" and/or "windows" to oversee object presentation, functionality, placement, and interactions. By relying on app constructs designed for desktop computing and mobile device interactions, these existing systems remove the user experience from being focused on people and objects. For example, by requiring users to pull up a window or app interface to create and modify objects, users lose the perception of the virtual objects being real. Furthermore, existing systems' reliance on a central app to control all the 3D objects the app creates wastes processing resources by constantly executing unnecessary aspects of the app beyond those needed solely to maintain the 3D object. This can be especially wasteful when some of those objects are inactive. Such reliance on the originating app to maintain the objects also results in the objects disappearing if the app is closed, reducing flexibility and usability of the system. In addition, when an app is in control of objects, the object can only react to context factors the app is aware of. However, to maintain security, many systems may not provide context factor access to an app whose limits on sharing of those context factors cannot be guaranteed. It can also be computationally expensive to have apps as a second level of abstraction between the operating system and the objects, requiring coordination of providing context factors to an app for the app to then pass down to objects. In addition, existing systems fail to provide appropriate methods for organizing objects placed in an artificial reality environment, controlling which objects can interact with each other, and what the results are for such interactions. These limitations in existing artificial reality systems result in artificial reality environments that are both cluttered and difficult for users to control.

The artificial reality system and processes described herein that use augments as fundamental objects that exist separate from the entities that created them and provide systems and processes for orchestrating interactions between augments are expected to overcome these problems associated with conventional artificial reality systems. In particular, the artificial reality system and processes described herein are expected to remove layers of interactions with application controls, allowing more realistic interactions in an artificial reality environment by allowing users to treat virtual objects more like real-world objects. Further, the artificial reality system and processes are expected to preserve processing resources by having augments exist independently without having to maintain execution of the application that created them. Processing resources are also preserved by reducing the number of virtual objects used in an artificial reality environment (i.e., by combining what would otherwise be multiple virtual objects into one combination augment, the artificial reality system can render less overall virtual augments, significantly reducing processing and other resource utilization). Yet further, the artificial reality system and processes are expected to increase usability, organization, and flexibility in the artificial reality environment by allowing individual augments to exist when the entity that created them closes, allowing augments to be combined into combination augments, and allowing users to perform intuitive actions with augments by moving them together. Also, the artificial reality system and processes are expected to provide greater security by directly controlling which augments receive context factors, while also reducing overhead in coordinating context factor distribution by removing an extra layer of coordination.

In addition to providing these benefits in organization, usability, flexibility, security, and preserving processing resources, the artificial reality system and processes described herein are rooted in computerized artificial reality systems, providing new core concepts specifically designed for object control and interaction in artificial reality environments. While the artificial reality system and processes described herein provide a user experience of orchestrating augments in a manner similar to real objects, the disclosed systems and processes are implemented with specialized data structures and interaction rules that are not analogs to either traditional computing interactions or interactions with real objects. Further, the augment orchestration system and processes described herein provide object super powers, allowing combinations and actions to be performed simply by bringing augments together in a way not provided in traditional computing interactions or interactions with real objects.

Several implementations are discussed below in more detail in reference to the figures. FIG. 1 is a block diagram illustrating an overview of devices on which some implementations of the disclosed technology can operate. The devices can comprise hardware components of a computing system 100 that enables orchestrating interactions between augments, such as creating combinations, causing linking actions, and extracting augments from a combination. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory.

Memory 150 can include program memory 160 that stores programs and software, such as an operating system 162, augment orchestration system 164, and other application programs 166. Memory 150 can also include data memory 170 that can include, for example, augments, augment combination rules/tables, context data, differentiation results, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
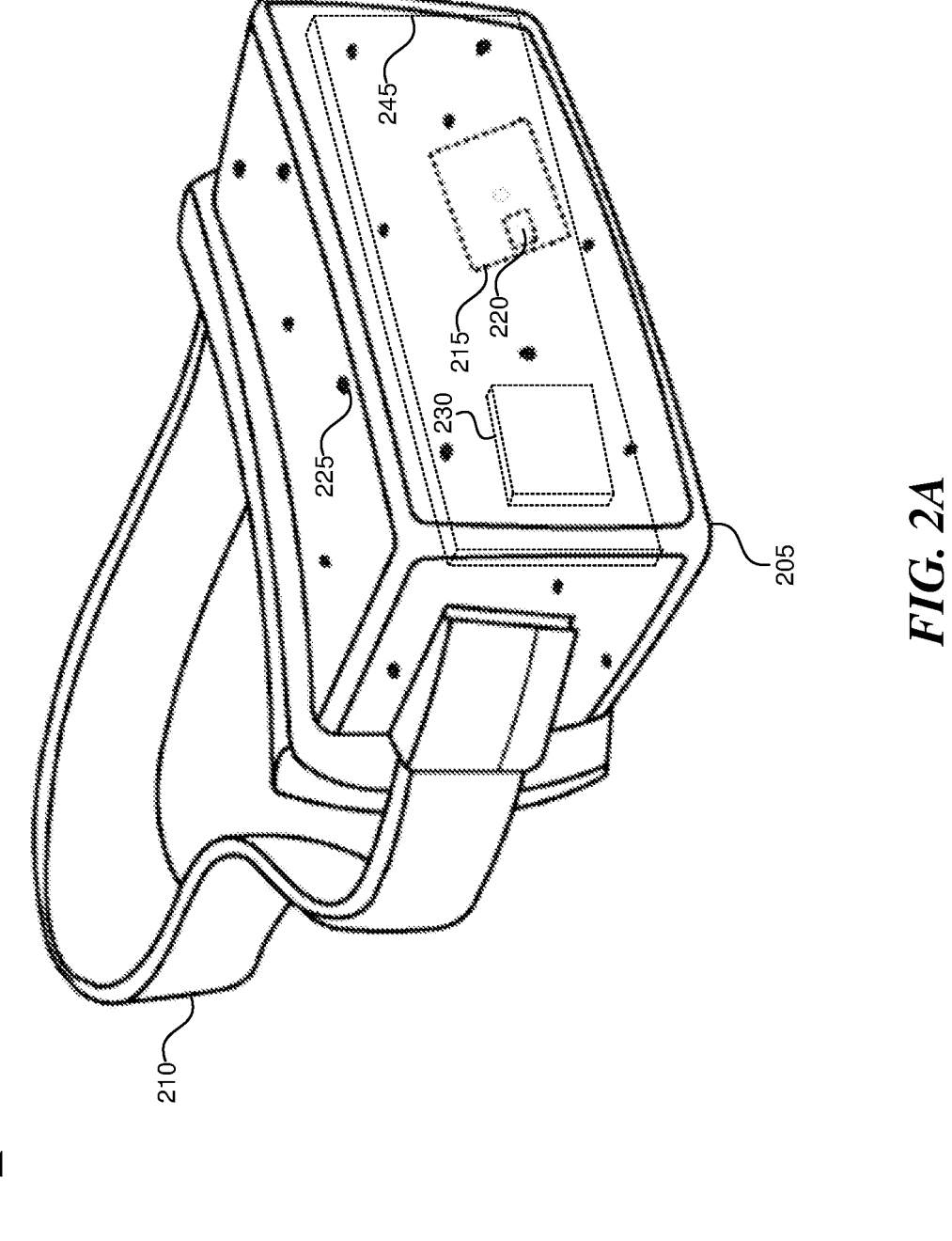
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
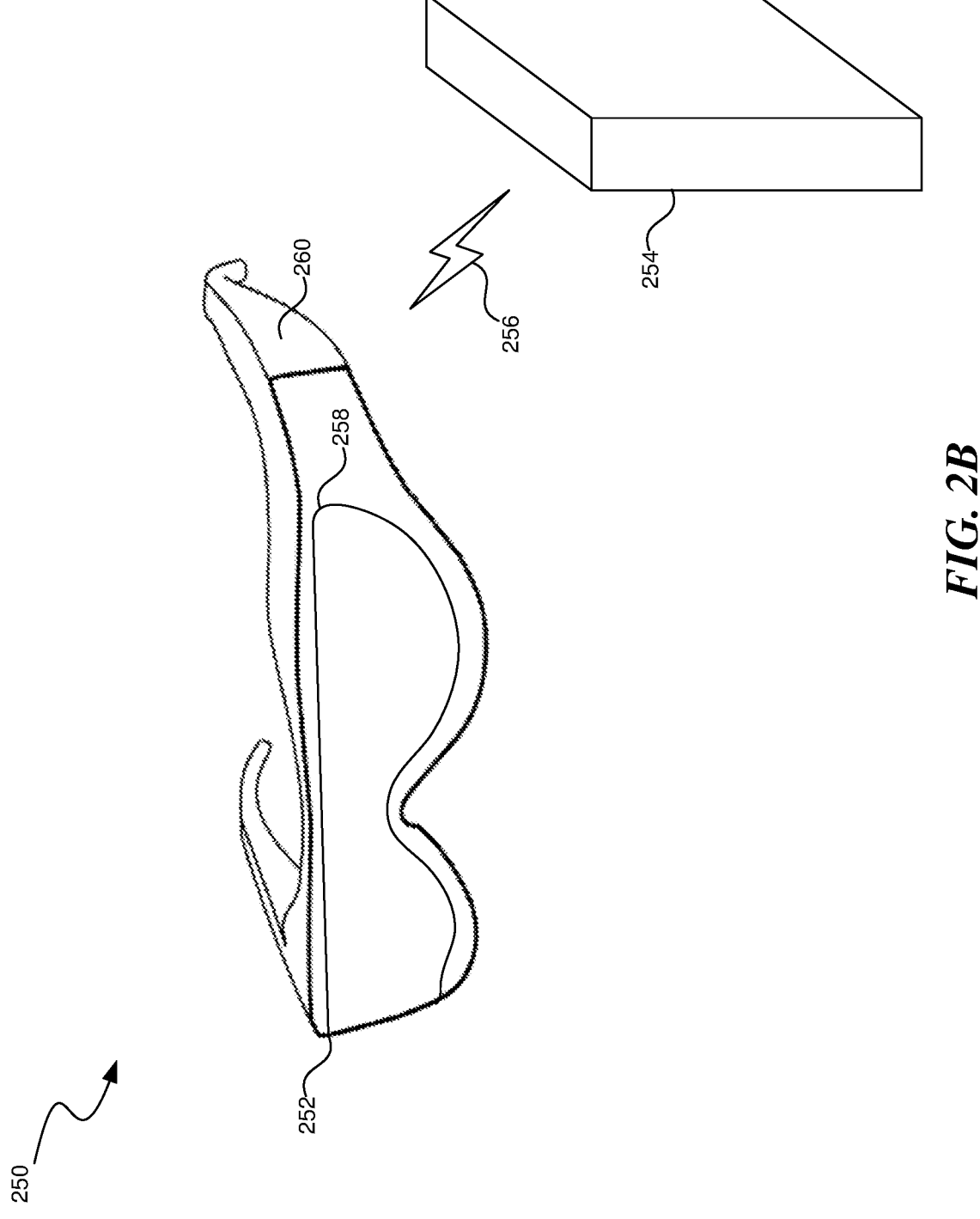
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
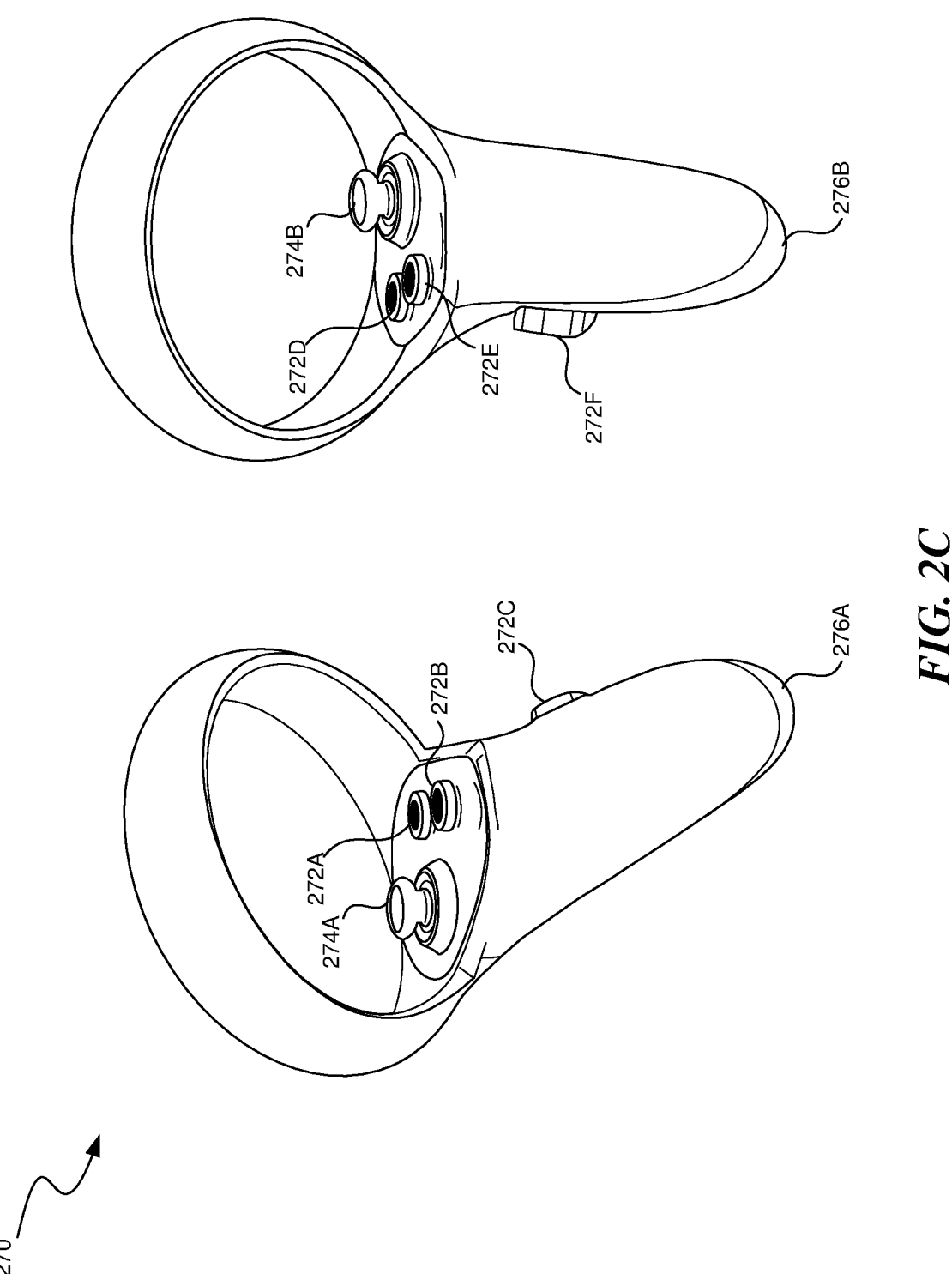
FIG. 2C illustrates controllers, which, in some implementations, a user can hold in one or both hands to interact with an artificial reality environment.

FIG. 2C illustrates controllers 270, which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc. To monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions.

Figure 3:
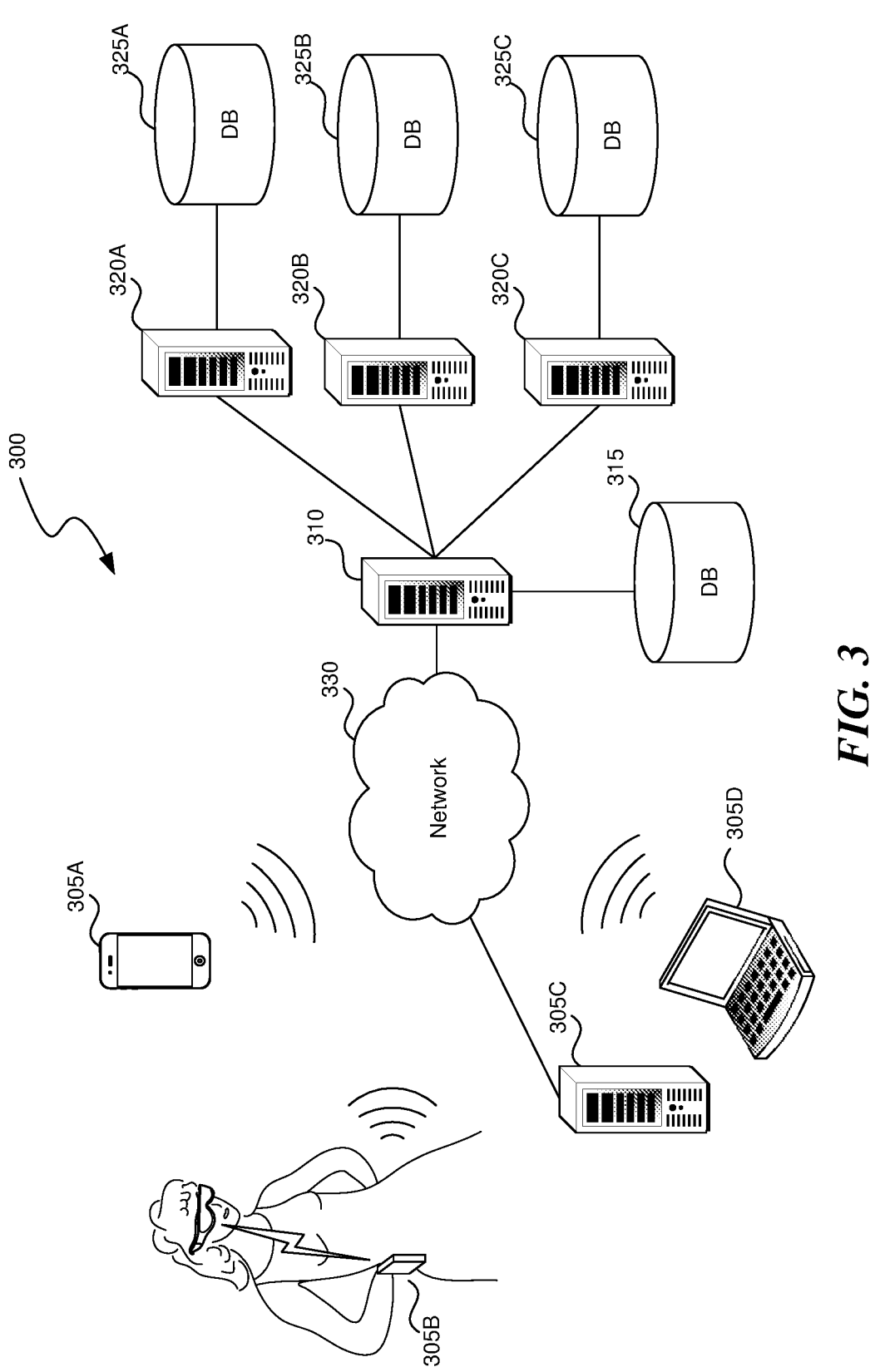
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

In some implementations, servers 310 and 320 can be used as part of a social network. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc. In some cases, nodes on the social graph can be represented as augments by the artificial reality system. Content items can be any digital data such as text, images, audio, video, links, webpages, minutia (e.g., indicia provided from a client device such as emotion indicators, status text snippets, location indictors, etc.), or other multi-media. In various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea.

A social networking system can enable a user to enter and display information related to the user's interests, age/date of birth, location (e.g., longitude/latitude, country, region, city, etc.), education information, life stage, relationship status, name, a model of devices typically used, languages identified as ones the user is facile with, occupation, contact information, or other demographic or biographical information in the user's profile. Any such information can be represented, in various implementations, by a node or edge between nodes in the social graph. A social networking system can enable a user to upload or create pictures, videos, documents, songs, or other content items, and can enable a user to create and schedule events. Content items can be represented, in various implementations, by a node or edge between nodes in the social graph.

A social networking system can enable a user to perform uploads or create content items, interact with content items or other users, express an interest or opinion, or perform other actions. A social networking system can provide various means to interact with non-user objects within the social networking system. Actions can be represented, in various implementations, by a node or edge between nodes in the social graph. For example, a user can form or join groups, or become a fan of a page or entity within the social networking system. In addition, a user can create, download, view, upload, link to, tag, edit, or play a social networking system object. A user can interact with social networking system objects outside of the context of the social networking system. For example, an article on a news web site might have a "like" button that users can click. In each of these instances, the interaction between the user and the object can be represented by an edge in the social graph connecting the node of the user to the node of the object. As another example, a user can use location detection functionality (such as a GPS receiver on a mobile device) to "check in" to a particular location, and an edge can connect the user's node with the location's node in the social graph.

A social networking system can provide a variety of communication channels to users. For example, a social networking system can enable a user to email, instant message, or text/SMS message, one or more other users. It can enable a user to post a message to the user's wall or profile or another user's wall or profile. It can enable a user to post a message to a group or a fan page. It can enable a user to comment on an image, wall post or other content item created or uploaded by the user or another user. And it can allow users to interact (e.g., via an avatar) with objects or other avatars in an artificial reality environment, etc. In some embodiments, a user can post a status message to the user's profile indicating a current event, state of mind, thought, feeling, activity, or any other present-time relevant communication. A social networking system can enable users to communicate both within, and external to, the social networking system. For example, a first user can send a second user a message within the social networking system, an email through the social networking system, an email external to but originating from the social networking system, an instant message within the social networking system, an instant message external to but originating from the social networking system, provide voice or video messaging between users, or provide a virtual environment were users can communicate and interact via avatars or other digital representations of themselves. Further, a first user can comment on the profile page of a second user, or can comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, or to view pictures of another user. Likewise, becoming friends within a social networking system can allow a user greater access to communicate with another user, e.g., by email (internal and external to the social networking system), instant message, text message, phone, or any other communicative interface. Being friends can allow a user access to view, comment on, download, endorse or otherwise interact with another user's uploaded content items. Establishing connections, accessing user information, communicating, and interacting within the context of the social networking system can be represented by an edge between the nodes representing two social networking system users.

In some implementations, any of the social networking actions described herein can be enabled by an artificial reality system through actions a user can perform in an artificial reality environment.

In addition to explicitly establishing a connection in the social networking system, users with common characteristics can be considered connected (such as a soft or implicit connection) for the purposes of determining social context for use in determining the topic of communications. In some embodiments, users who belong to a common network are considered connected. For example, users who attend a common school, work for a common company, or belong to a common social networking system group can be considered connected. In some embodiments, users with common biographical characteristics are considered connected. For example, the geographic region users were born in or live in, the age of users, the gender of users and the relationship status of users can be used to determine whether users are connected. In some embodiments, users with common interests are considered connected. For example, users' movie preferences, music preferences, political views, religious views, or any other interest can be used to determine whether users are connected. In some embodiments, users who have taken a common action within the social networking system are considered connected. For example, users who endorse or recommend a common object, who comment on a common content item, or who RSVP to a common event can be considered connected. A social networking system can utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

In some cases, augment types can correspond to node types of a social graph. In some implementations, aspects of the social graph (e.g., what nodes it contains and how those nodes are connected) can inform how augment orchestration occurs. For example, when two people augments are combined, the result can depend on whether the augments corresponding to people identified as "friends" in the social graph. Any of the augment orchestration rules can use aspects of the social graph to define linking or extraction results.

Figure 4:
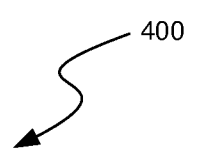
FIG. 4 is a block diagram illustrating components which, in some implementations, can be used in a system employing the disclosed technology.
Figure 4:
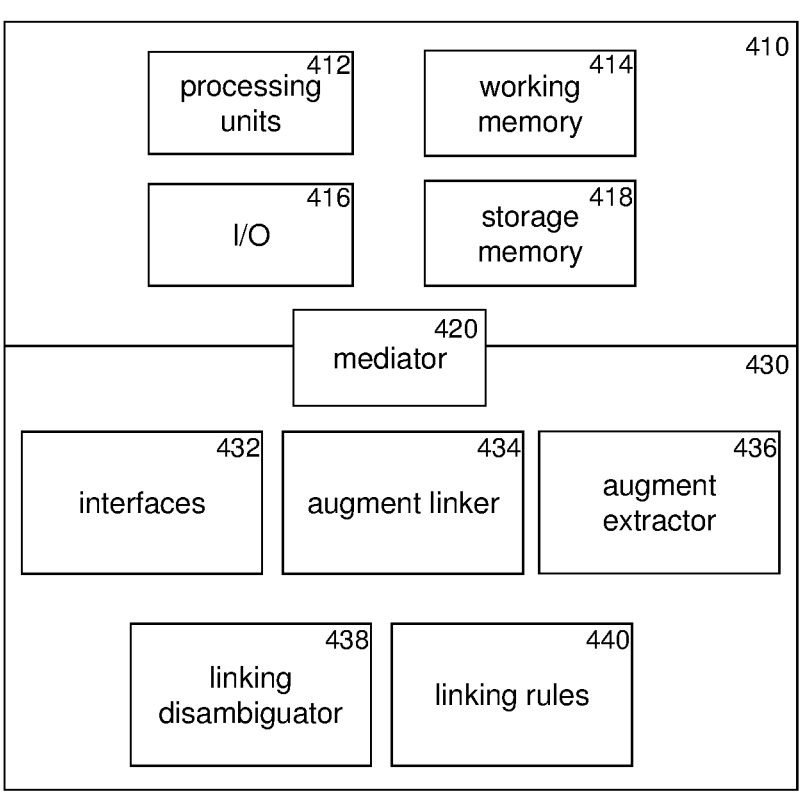

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for orchestrating interactions between augments. Specialized components 430 can include augment linker 434, augment extractor 436, linking disambiguator 438, linking rules 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

In some implementations, augment linker 434 can receive an indication of two or more augments indicated for linking; can determine, based on linking rules 440, a result of the linking; and can perform the result by performing one or more actions and/or replacing one or more of the indicated two or more augments with another combination augment. Additional details on linking augments are described below in relation to FIG. 5.

In some implementations, augment extractor 436 can receive an indication of an augment to extract from a combination and can either move the augment out of the combination into the artificial reality environment (i.e., peel it out without leaving a copy in the combination) or can create a copy of the augment in the artificial reality environment (leaving a copy in the combination). Whether augment extractor 436 copies or peels the augment from the combination can depend on whether the user provides a removal indication for the extraction. Additional details on extracting augments from combinations are described below in relation to FIG. 6.

In some implementations, a subset of linking rules 440 can be executed for a given linking of augments. In various implementations, the rules executed can be the rules defined as properties of the augments being linked, rules defined by a data structure cross-referencing types of augments, dynamic rules that are executed based on a context of the combination, etc. In some implementations, the action that triggered the linking can be ambiguous, in which case linking disambiguator 438 can select rules to execute, e.g., based on whether a socket is indicated in the linking or by presenting a dialog to the user to select which action is intended. Additional details on evaluating rules to determine a combination result are described below in relation to blocks 506-510 of FIG. 5.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
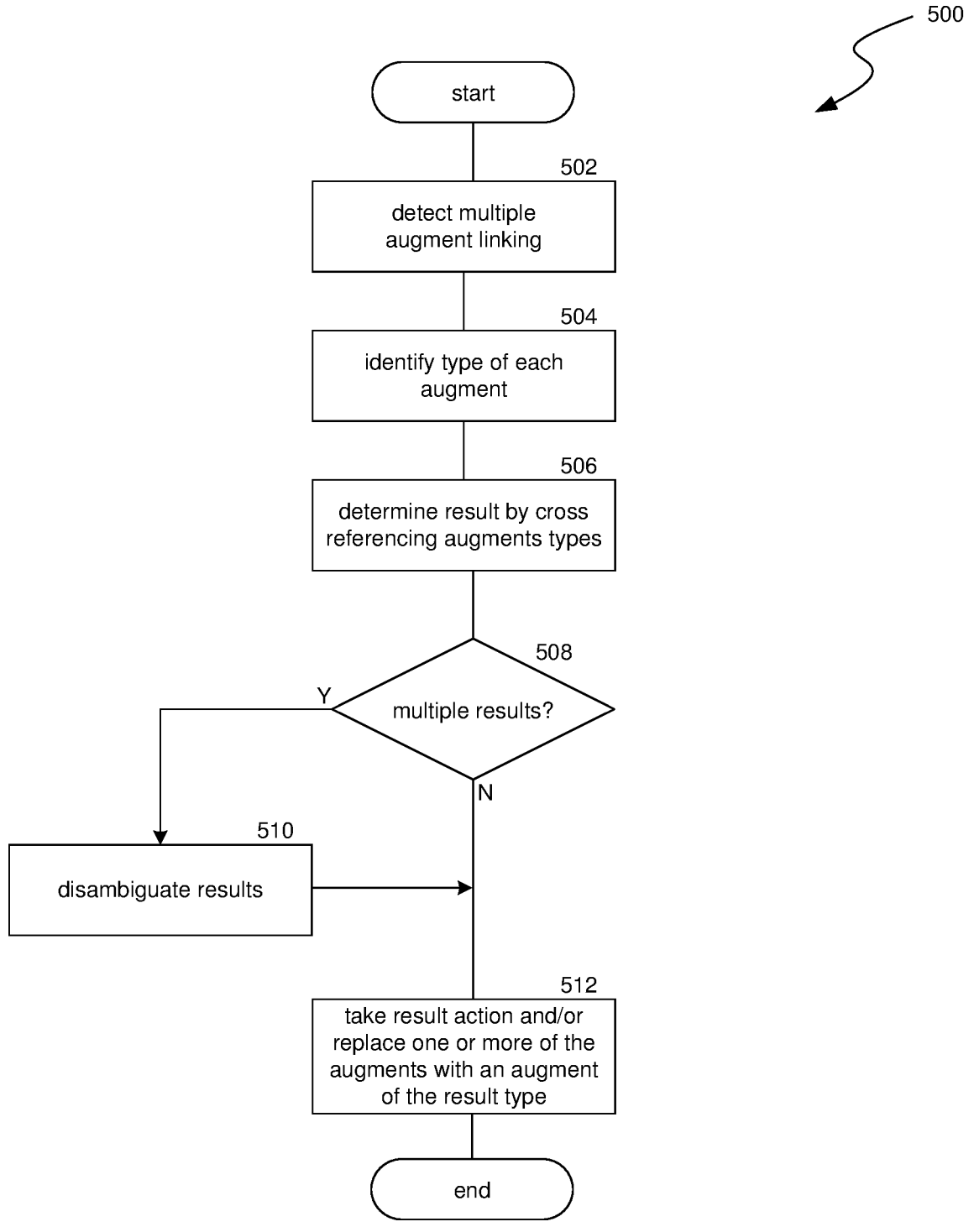
FIG. 5 is a flow diagram illustrating a process used in some implementations of the present technology for linking augments.

FIG. 5 is a flow diagram illustrating a process 500 used in some implementations of the present technology for linking augments. In some implementations, process 500 can be performed by an XR device, such as device 100. In some implementations, process 500 can be performed when the XR device starts up (e.g., as part of an operating system or shell program) or as part of another application executed by the XR device.

Process 500 can be waiting for a triggering action, which it detects at block 502 when process 500 detects an instruction to link multiple augments. In some implementations, this instruction can be the result of a user providing the instruction, such as by positioning one or more augments to intersect with one or more other augments, providing a voice instruction to link two or more augments, activating a linking control on two or more augments, etc.

In response to detecting the triggering action for linking augments, at block 504 process 500 can identify a type of each augment being linked. For example, augments can have types such as "person," "event," "time," "message," "social media post," "place," "album," "video," "3D model," "list," "song," "product," "group," "feed," etc. At block 506, process 500 can cross-reference the types of the augments being combined to determine a result. In some implementations, the cross-referencing can be performed by using a lookup table, such as the example table shown in FIGS. 13A and 13B. In some cases, the result can be a type of an augment to create to replace the augments being linked, such as a group of people augment to replace two people augments being linked. In some cases, the result can be an action to embed one of the augments to be linked in another of the augments to be linked, such as embedding a picture augment within a photo album augment. In yet other cases, the result can be for an action that the artificial reality system performs in response to the augment linking, such as establishing a chat session with a user when an augment representing that user is linked to an augment representing a messaging system. In some implementations, the table can specify a rule to evaluate (as discussed below with context input parameters) to dynamically generate the result. The result can be one or more of: a result augment, an action, a rule, or any combination thereof.

In some implementations, instead of identifying augment types (block 504) and cross-referencing them to determine a result (block 506), process 500 can cause other rules to be evaluated to determine a result. For example, one or more of the augments being linked can have a set of rules that define results for a combination, and process 500 can surface a context as parameters for evaluation of the rules. Such a context can include, for example, features of the augments being linked, features of a surface the augments are attached to, system parameters (e.g., time, location, user details, etc.), social graph information, or any other data available to the system that the augment (or program evaluating the rules) is authorized to access.

In various implementations, the result can cause one augment to "link to" another augment or to "link in" the augments. An augment is linked in another augment when there is reciprocal linking between the augments, i.e., each augment stores a link to the other augment. For example, when a person augment is linked in an event augment, the person augment can be updated to have a reference to the event (e.g., "my events") and the event augment can be updated to include a reference to the person (e.g., "invitees"), the person augment can be removed from the artificial reality environment, and the event augment can show the person in an invitee list. An augment is linked to another augment when only one of the augments stores a link to the other augment. For example, when a weather indicator augment is linked in an event augment, the event augment may not have any rules for how to respond to this linking, so it takes no action. However, the weather augment may have a rule to link to the event and set its location and date to correspond to the location and date of the event. This in turn can cause the weather augment to update its display to show the predicted weather for the date and location of the event. Additional details on augment "linking in" versus "linking to" are provided below in relation to FIG. 9.

In some implementations, a cross reference table or rules defined for augments being linked may not include a match between the types of the augments being linked. In this instance, a default action can occur, such as forming the augments into a default combination or not linking the augments.

At block 508, process 500 can determine whether there is an ambiguity in the linking such that there are multiple possibilities for which cross-referencing to perform or which rules to evaluate to determine results. For example, an augment of a first type can be mapped to multiple possible results when it is linked to an augment of a second type (where the linking is not configures to use all those results). As a more specific example, an augment of a person type can be linked to an augment group (i.e., a combination of multiple other person augments), but that linking can be mapped to both a result of adding the person to the group and a result of setting up a messaging session between the person and the group. Thus, a disambiguation would be needed to determine which action to take. As yet another example, a disambiguation can be needed when an augment is linked with an augment that is a combination of multiple types of other augments. It can be unclear if the linking is to combine the augment with the combination or with one of the sub-augments of the combination. For example, combining a person augment with an event can be mapped to a result of sending a notification of the event to the person (i.e., "sharing the event") while the event can include a group augment specifying the invitees to the event, so if the person were added to that group, the person would be invited to the event. It can be ambiguous which result the user intends, so process 500 can proceed to block 510. If only one result can be indicated by the combination, process 500 can continue to block 512.

At block 510, process 500 can perform a disambiguation procedure to determine which of the multiple possible results to use. In some cases, the disambiguation can be based on mechanical aspects the action that triggered the linking and whether that action corresponds to a "socket." For example, an area of an augment can be designated as a socket, indicating that a particular result should be selected if the linking is for that socket and a default result should be used when the linking is not for any socket. In various implementations, a linking between a first augment and an augment with a socket can be for the socket if: any part of the first augment touches the socket, at least a percentage (e.g., 20%, 50%, 70% etc.) of the first augment overlaps the socket, or the first augment only touches the socket. Continuing the previous example where the person augment is being linked to the event, the volume of the event augment can specify an area illustrating the invitee group as a socket. If the person augment is dragged such that at least 40% of the person augment overlaps with the invitee group socket, then the person is added to the invitee group and is invited to the event; otherwise the event is shared with the person. An example of disambiguation based on sockets is provided below in relation to FIG. 11A.

In some cases, the disambiguation procedure can include presenting the result options to the user and using the result(s) the user selects. An example of disambiguation based on user selection is provided below in relation to FIG. 11B. In other cases, the disambiguation can depend on a current context. For example, further rules can specify which result to select e.g., based on which augment was moved to indicate the linking, features of the user controlling the linking, or other contextual factors.

At block 512, process 500 can take one or more actions specified by the result(s) determined at block 506 or 510 and/or replace one or more of the linked augments with an augment of the type specified in the result(s). As examples, where the linked augments are two person augments and the result specifies a group augment type, the two person augments can be replaced with a group augment; where the linked augments are a time augment and a place augment, the result can cause the time augment to be set to the local time of the place; where the linked augments are a photo augment and a person augment, the result can specify an action of sharing the photo with the person can be performed. Many other actions and combinations are possible, some of which are shown in the table in FIGS. 13A and 13B.

Figure 6:
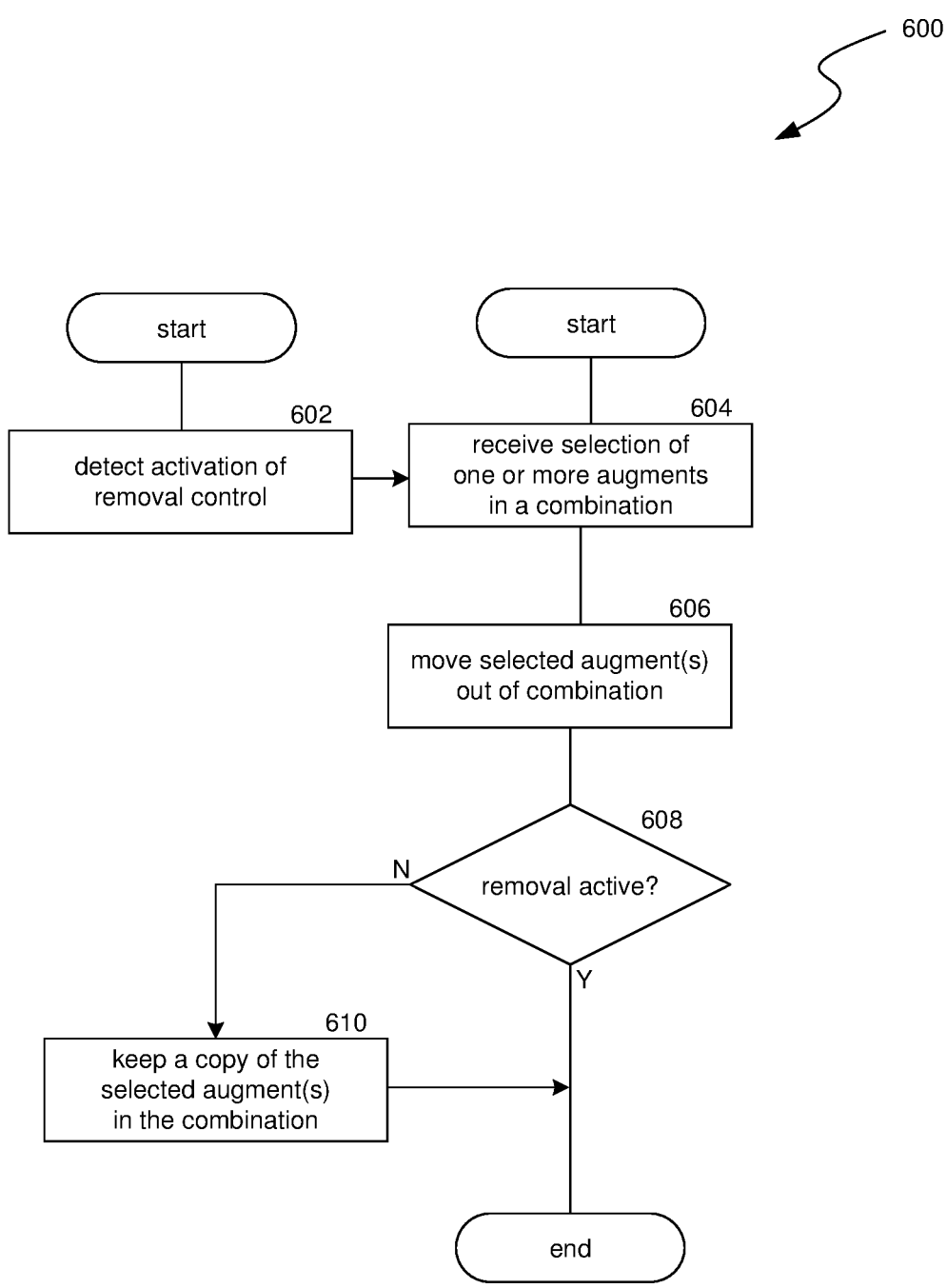
FIG. 6 is a flow diagram illustrating a process used in some implementations of the present technology for extracting an augment from a combination.

FIG. 6 is a flow diagram illustrating a process 600 used in some implementations of the present technology for extracting an augment from a combination. Similarly to process 500, in some implementations, process 600 can be performed by an XR device, such as device 100. In some implementations, process 600 can be performed when the XR device starts up (e.g., as part of an operating system or shell program) or as part of another application executed by the XR device. In some cases, processes 500 and 600 can be controlled by, or be parts of, the same system of the XR device.

In various cases, process 600 can begin in different ways. In some cases, process 600 begins at block 602, where process 600 detects the activation of a removal control. The activation of the removal control signals that the extraction executed by process 600 will peel removed augments from a combination. In various implementations, the activation of the removal control can be based on various user inputs. For example, a user can activate a GUI element on the combination (see e.g., FIG. 12A) or in another menu, perform a particular gesture as part of the removal, make a voice command, etc. In other cases, process 600 begins at block 604, where process 600 has not detected the activation of a removal control and thus the extraction executed by process 600 will keep a version of removed augments in the combination as versions of those augments are also created in the artificial reality environment outside the combination.

At block 604, process 600 can receive a selection of one or more augments in a combination to be extracted (either for peeling or copying). A user can indicate this selection in various ways, such as with a gesture (e.g., reaching into the combination and "grabbing" one or more indicated augments), using a ray cast in the artificial reality environment (e.g., circling one or more augments or causing the ray to intersect with one or more augments), etc.

At block 606, a version of the augments selected at block 604 are moved to be outside the combination. In some implementations, moving an augment outside a combination can trigger a rule defined in the augment or mapped to the change of the type of combination. As discussed above in relation to process 500, the result can trigger various types of actions and/or cause the combination to change to a different type (e.g., if there is only one augment left in the combination, the augment combination can be replaced with just the remaining augment).

At block 608, process 600 can determine whether the removal control was detected at block 602. If so, process 600 can end. If not, process 600 can proceed to block 610. At block 610, process 600 can keep a copy of the augment(s) selected at block 604 in the combination, thus having the extraction result in a version of the selected augments both in the combination and external to the combination. Process 600 is shown with the steps of first, at block 606, moving an augment out of the combination and then, if the extraction is for a copy, making a copy in the combination. However, in other implementations, the process 600 can be performed in a different order, such as if the extraction is for a copy, process 600 can leave a copy in the combination and create a new version outside the combination. In some implementations, the versions inside the combination and the version outside can be GUI representations linked to the same virtual object (e.g., if one is changed, the other is similarly changed as they share data/parameters). In other implementations, the copies are separate virtual objects, such that changes to one are not necessarily propagated to the other. From block 610, process 600 can end.

FIGS. 7A-7D are conceptual diagrams illustrating an example 700 of combining two people augments into a group with group controls used to create an event for the group. Example 700 begins in FIG. 7A, with 700a, where multiple person augments 706 and 710 and groups (combinations of person augments) 712 and 714 are in an artificial reality environment. In example 700, multiple person augments can link to the same user profile and example 700 includes two versions 710 and 706 of the same person augment and another version of this person augment 708 is in group 712. In 700a, a user has extracted person augment 702 from group 714 (as a copy extraction) creating person augment 704, which the user is dragging out of the group 714 with a "grab" gesture (user hands not shown).

Figure 7A:
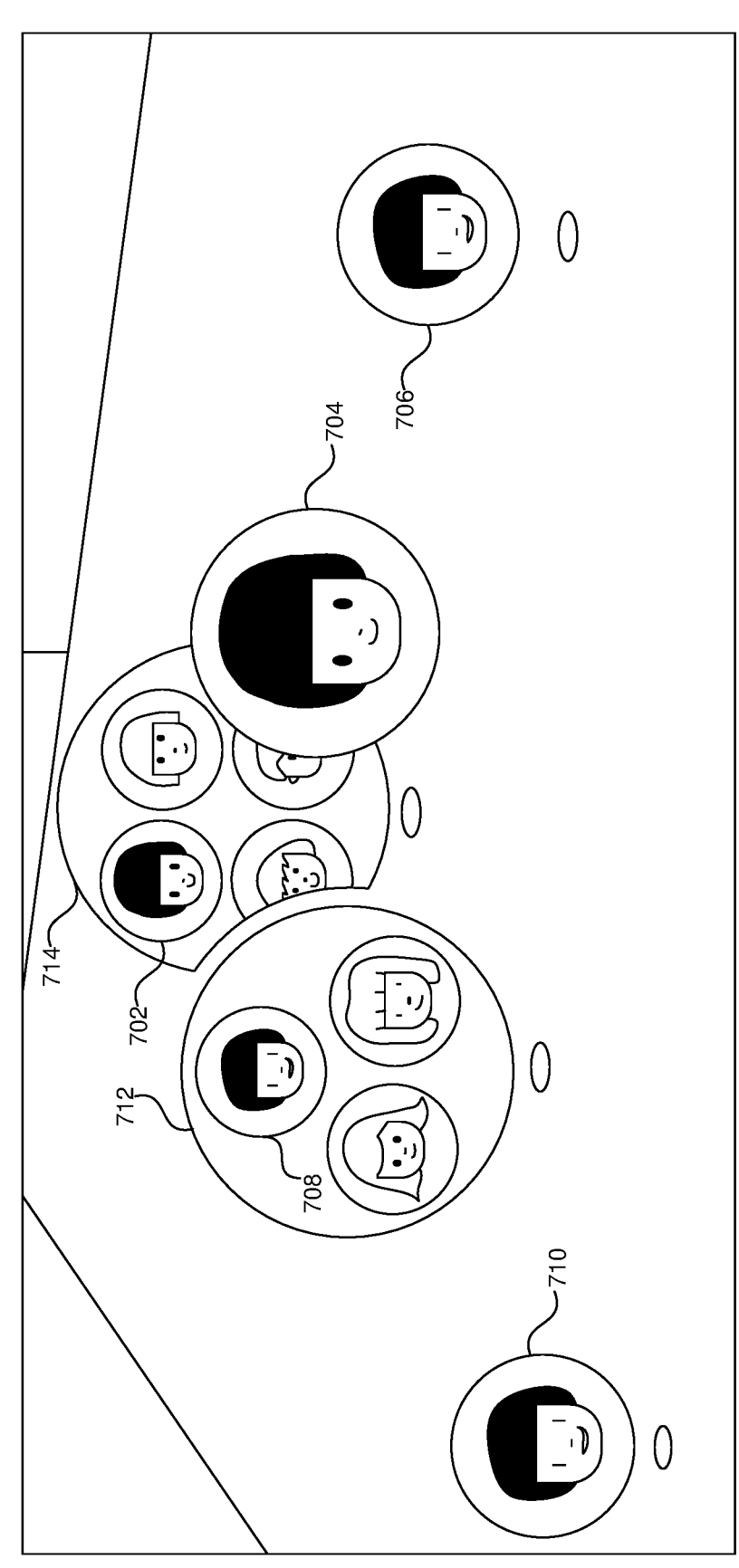
FIGS. 7A-7D are conceptual diagrams illustrating an example of combining two people augments into a group, with group controls used to create an event for the group.
Figure 7B:
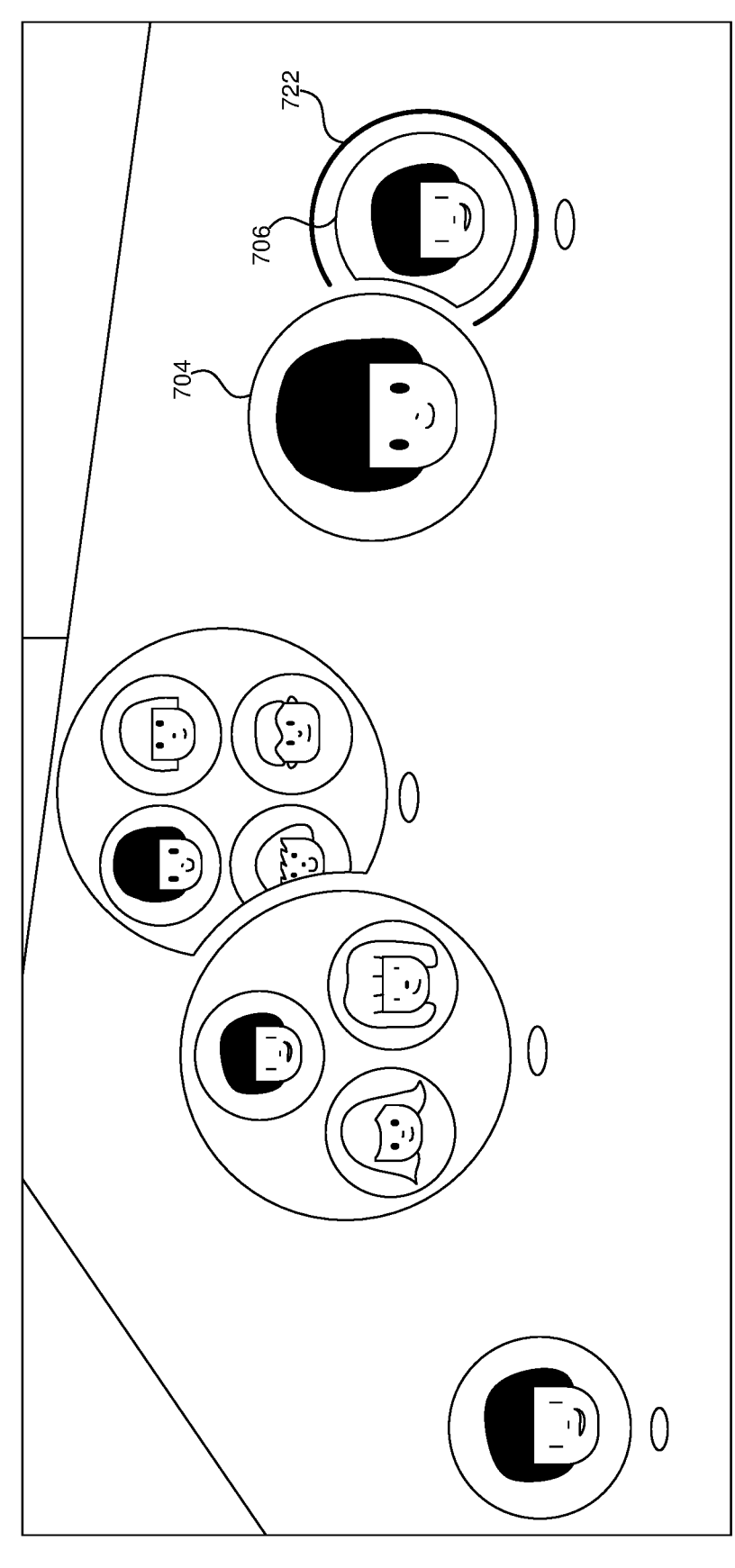

Example 700 continues in FIG. 7B, with 700b, where the user has dragged the person augment 704 to touch the person augment 706. In response to this touching, a visual affor-dance 722 is displayed, indicating that, if the user releases the person augment 704, it will trigger a linking between person augment 704 and person augment 706.

Figure 7C:
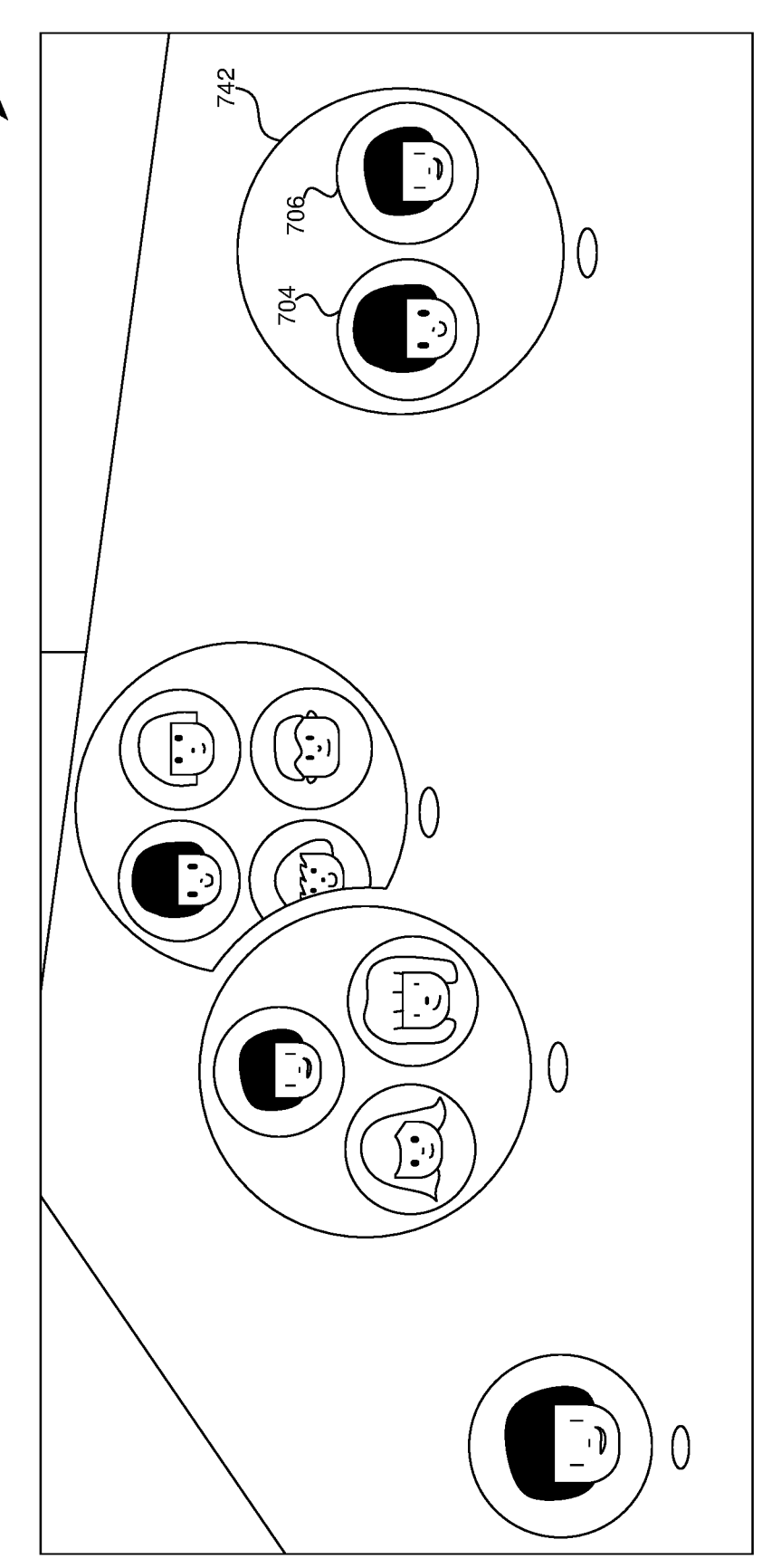

Example 700 continues in FIG. 7C, with 700c, where the user has released the person augment 704. This triggered the linking between person augment 704 and person augment 706. A cross reference between two people augments indicated their linking resulted in a group, thus the person augment 704 and the person augment 706 are replaced, in the artificial reality environment, with group 742.

Figure 7D:
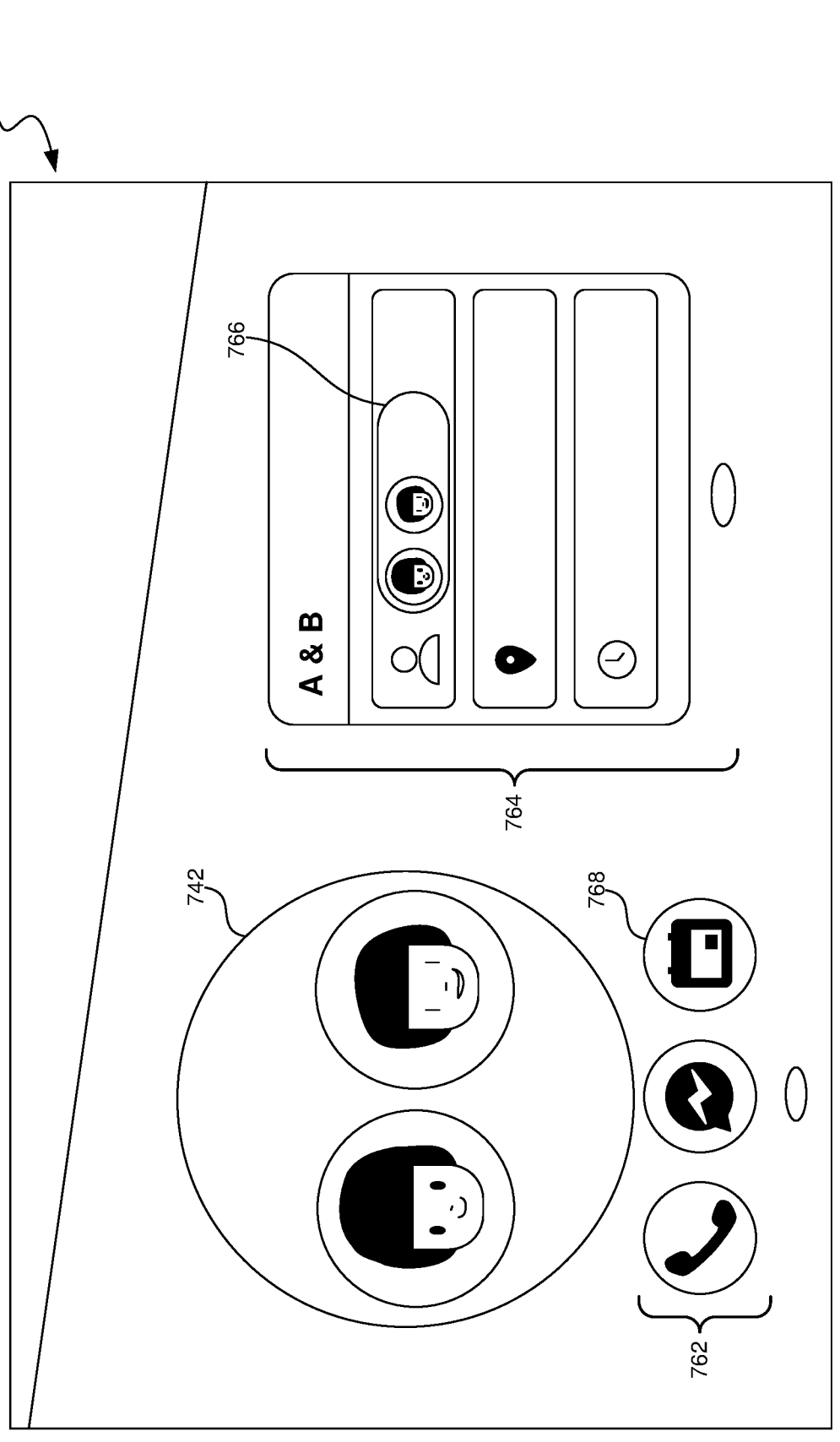

Example 700 continues in FIG. 7D, with 700d, where the user has selected group 742. This selection caused a corresponding menu of tools 762, for the group 742, to be displayed under the group 742. One of these tools includes a calendar tool 768. The user has activated the calendar tool 768, by performing a tap on it, causing the artificial reality system to create a new event augment 764. Because the event augment 764 was created by a tool for the group 742, the event augment 764 is automatically linked to the group 742, with the group 742 set as invitees to the event.

Figure 8A:
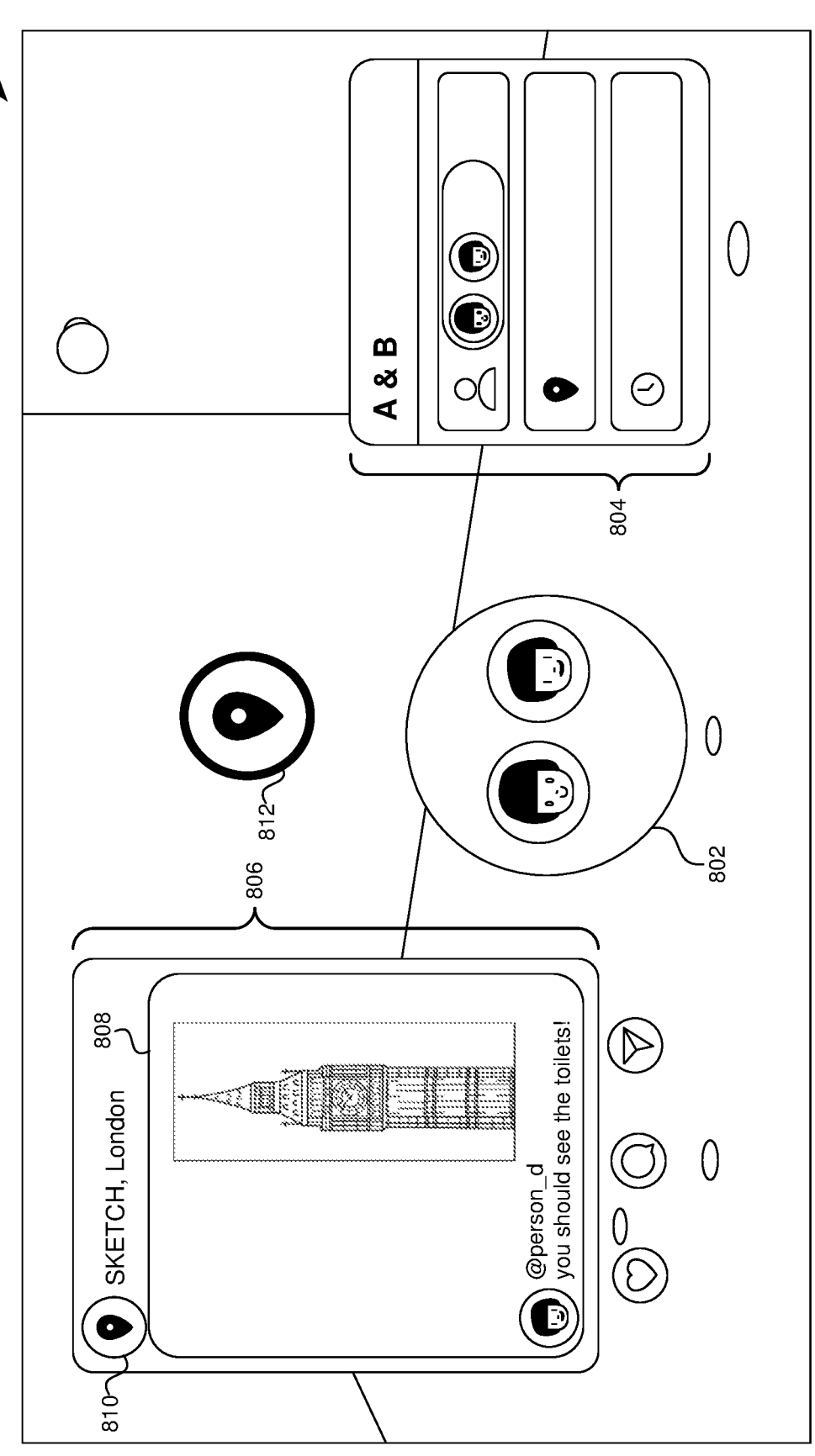
FIGS. 8A-8C are conceptual diagrams illustrating an example of adding a location augment to an event to set a location of the event.
Figure 8B:
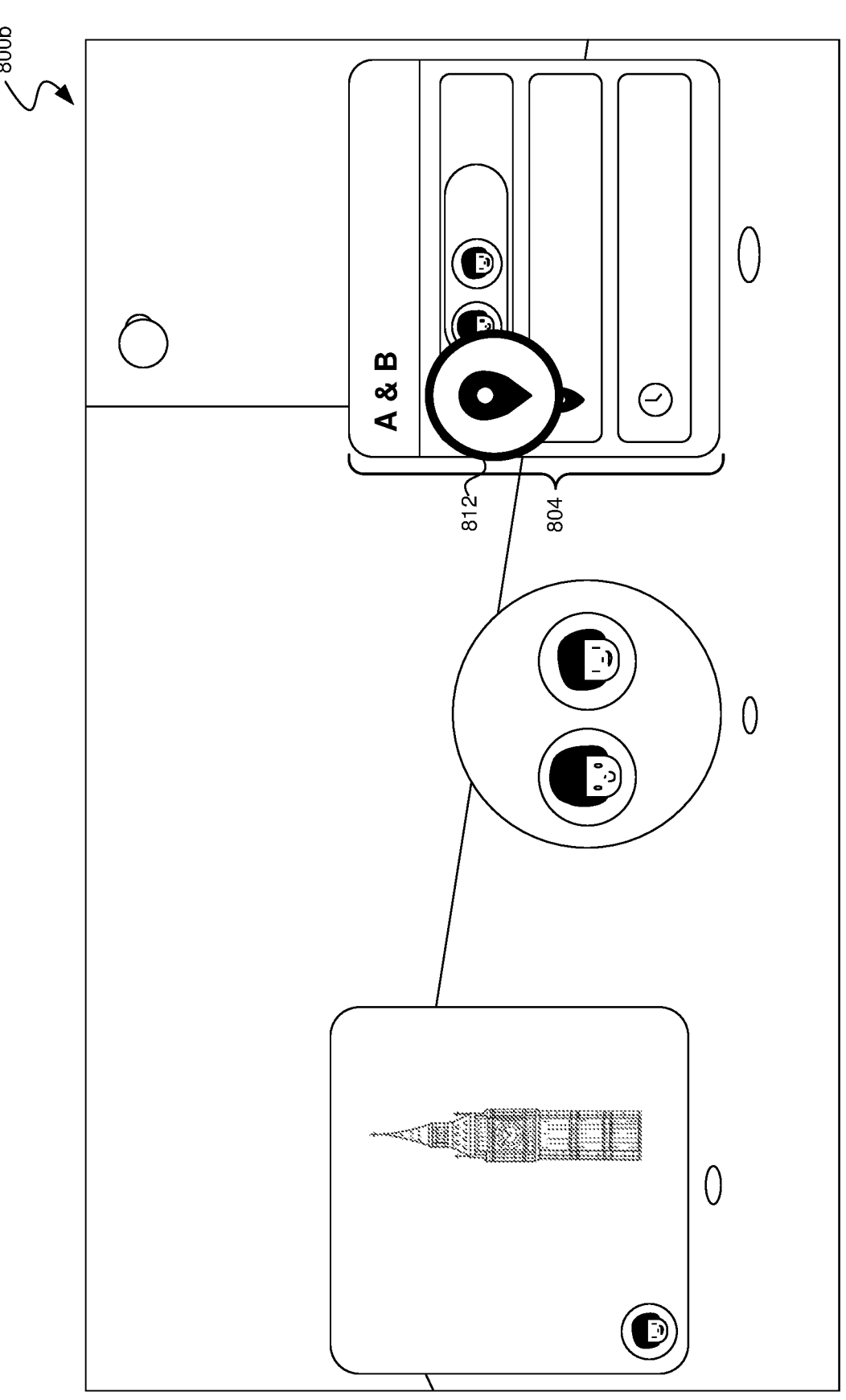
Figure 8C:
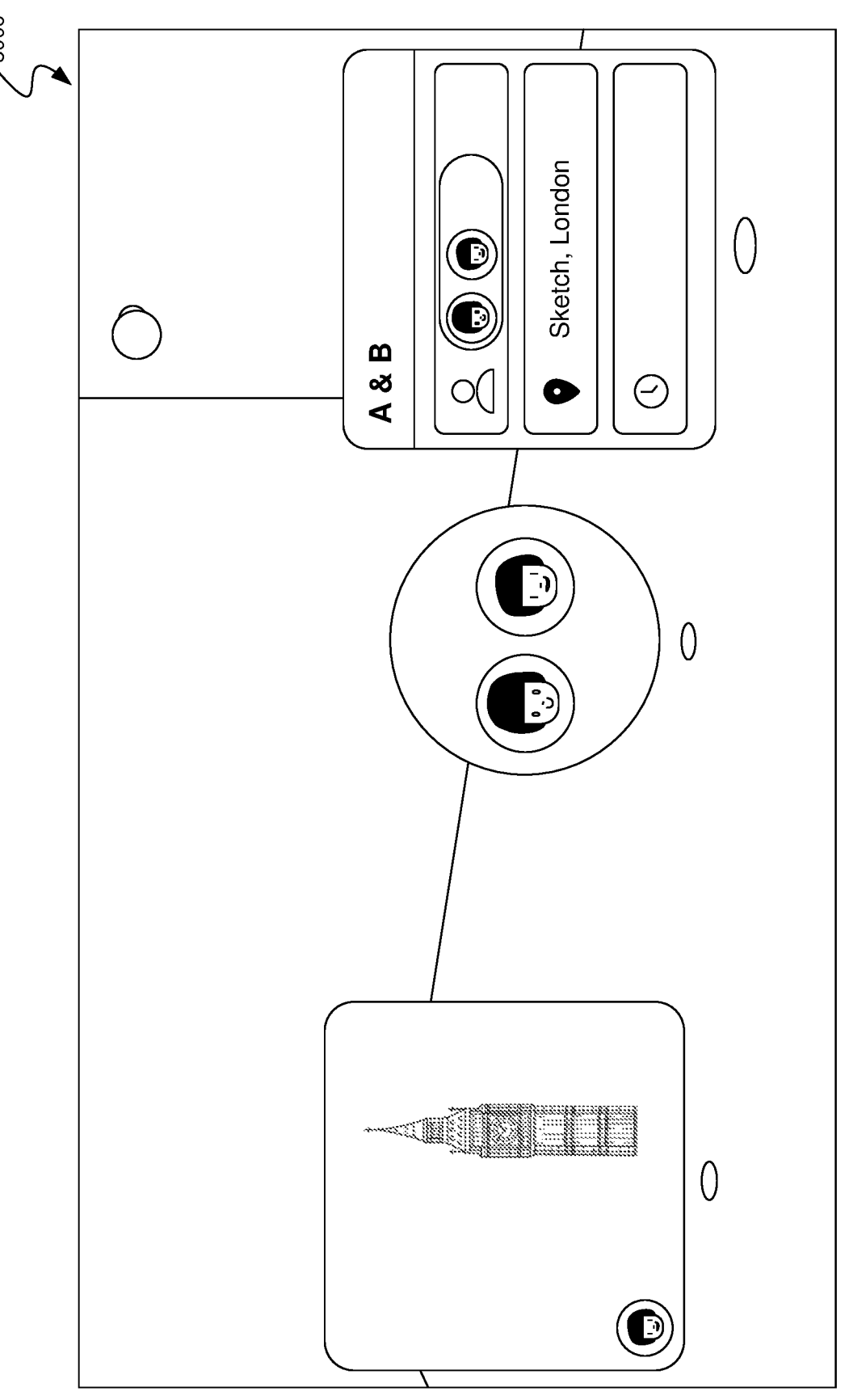

FIGS. 8A-8C are conceptual diagrams illustrating an example 800 of adding a location augment to an event augment to set a location of the event. For context, example 800 can be a continuation of example 700, but alternatively, the elements in example 800 can be initiated in other ways. Example 800 begins in FIG. 8A, with 800a, where there is a group augment 802, an event augment 804, and a social media post augment 806. The social media post augment 806 includes a photo augment 808 and a location augment 810. The user has selected the location augment 810, extracting it as location augment 812, dragging it toward the event augment 804.

Example 800 continues in FIG. 8B, with 800b, where the user has moved the location augment 812 to be in contact with event augment 804. Example 800 continues in FIG. 8C, with 800c, where, in response to the user releasing the location augment 812 while it is in contact with event augment 804, a linking is triggered. This linking causes a rule of event 804 to execute with a result of setting the event's location to be the location of the location augment 812 and removing the location augment 812 from the artificial reality environment.

Figure 9:
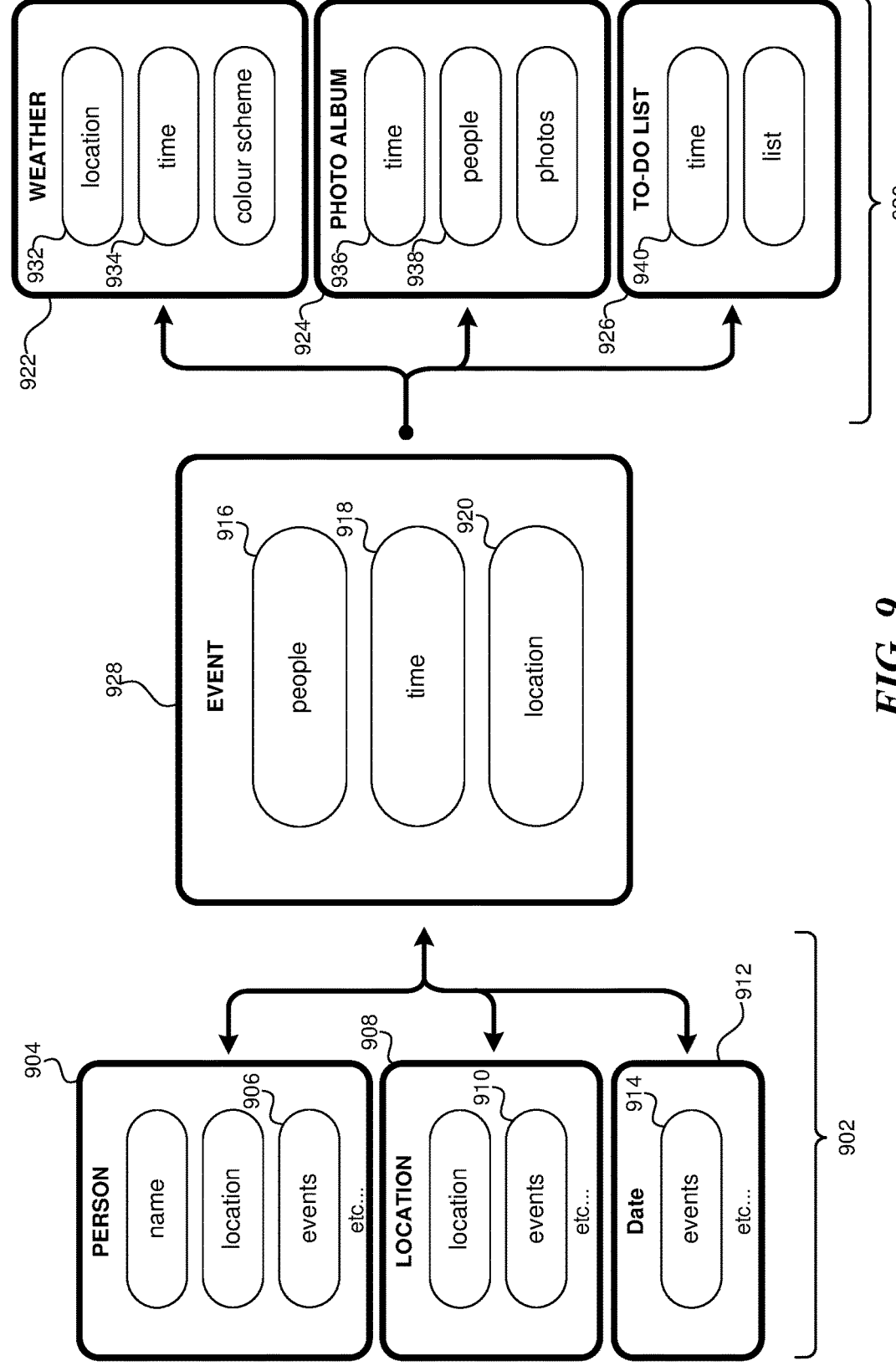
FIG. 9 is a conceptual diagram illustrating differentiations between augment linking, where an augment can be "linked in" another augment versus where an augment can be "linked to" another augment.

FIG. 9 is a conceptual diagram illustrating differentiations between augment linking where an augment can be "linked in" another augment versus where an augment can be "linked to" another augment. Linked augments 902 are "linked in" augment 928, as each of the augments 904, 908, and 912 have reciprocal links with augment 928. Augment 928 is an event augment with properties of invited people 916, an event time 918, and an event location 920. When the event augment is linked with an augment with a type matching one of these properties, it can set the property for that linked augment. For example, when date augment 912 is linked with event augment 928, the time property 918 can specify the date augment 912, causing the representations of the event augment 928 to show the date corresponding to date augment 921. Further, the date augment 912 has an events property 914 specifying events that occur on that date, and upon the linking of date augment 912 with event augment 928, the events property 914 can specify the event augment 928. This reciprocal linking defines the "linked in" relationship. Similar relationships are set between: events property 906 and event augment 928; people property 916 and person augment 904; events property 910 and event augment 928; and location property 920 and location augment 908.

Linked augments 930 are "linked to" augment 928, as properties of each of the augments 922, 924, and 926 are linked to augment 928, with properties set based on augment 928, but augment 928 does not have links to augments 922, 924, and 926. This non-reciprocal linking defines the "linked to" relationship. For example, when weather augment 922 is linked with event augment 928, a rule of weather augment 922 can cause the time property 934 to match the time property 918 and the location property 932 to match the location property 920. However, event augment 928 may not have any rules for linking with weather augments, so event augment 928 does not update to link with weather augment 922. Similar non-reciprocal relationships are set such that: time property 936 specifies time property 918; people property 938 specifies people property 916, and time property 940 specifies time property 918.

Figure 10:
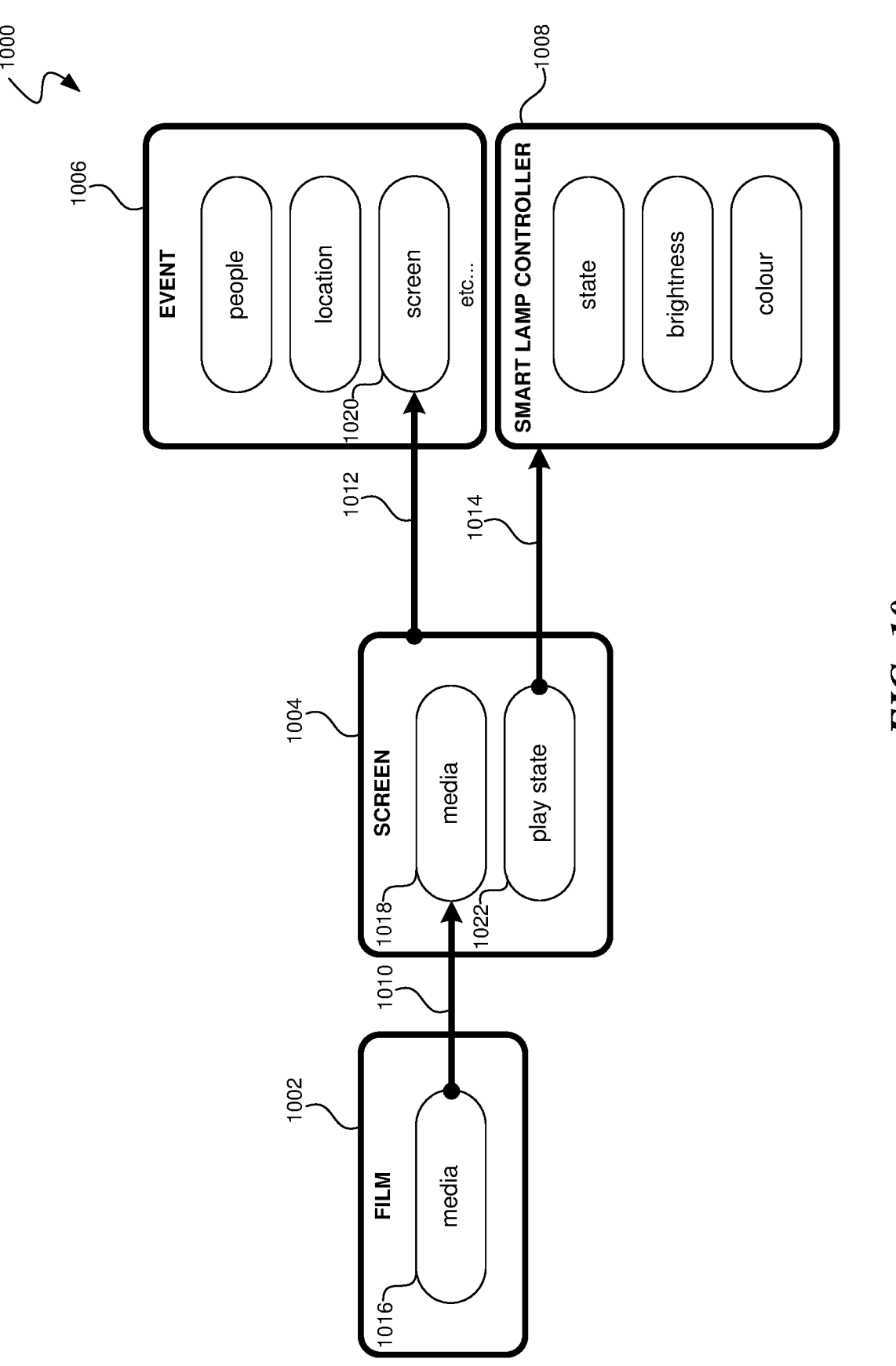
FIG. 10 is a conceptual diagram illustrating an example flow for organizing a media night with multi-device coordination based on augment linking.

FIG. 10 is a conceptual diagram illustrating an example 1000 flow for organizing a media night with multi-device coordination based on augment linking. In example 1000, a user is creating a live event to show a movie to friends, where she is screening the moving on a television she wants to link with her smart home. The user can begin by linking (1014) a screen augment 1004, associated with a television, with an internet-of-things ("IoT") augment 1008 for a smart lamp controller. For example, the user can drag and drop the screen augment 1004 onto the IoT augment 1008. A rule that has been setup for this linking 1014 can cause the play state 1022 of the screen augment 1004 to be accessible to the IoT augment 1008, where the IoT augment 1008 can be configured to send commands to connected smart lights based on the value of the play state 1022. For example, when the play state 1022 indicates a movie is playing, the smart lamp can dim the lights or set coloring of the lights to match coloring of the movie.

Next, the user can create an event augment 1006 for the event of watching the movie and drag a group of users onto it to set them as the invitees (not shown, but see FIG. 7). The event can have a screen property 1020, and when the user drags the screen augment 1004 onto the event augment 1006, they can link (1012) setting the screen property 1020 to indicate the screen 1004. For example, this can allow invited users at remote locations to view a copy of what's on the television associated with the screen augment 1004.

Finally, at the time of the event, the user can open a library of her movies and select a film augment 1002. By dropping this film augment 1002 onto the screen augment 1004, a link 1010 can be established. Link 1010 can cause the media 1016 of film augment 1002 to stream to the media property 1018, causing that media to be played on the television associated with screen augment 1004. The playing of the movie can cause the play state 1022 to change which, via link 1014, can cause the lamp controller to change the lighting.

Figure 11A:
FIG. 11A is a conceptual diagram illustrating an example of disambiguation of augment linking with multiple possible results based on sockets.

FIG. 11A is a conceptual diagram illustrating an example 1100 of disambiguation of for augment linking with multiple possible results based on sockets. In example 1100, a user is attempting to add a person to an event by dropping the person augment 1102 (which has been peeled out of group augment 1108) onto the event augment 1104. In example 1100, event augment 1104 has a user invite list which has been setup as a socket 1106. Socket 1106 is configured such that, when a person-type augment is dropped onto event augment 1104 in a manner where the person augment is touching the socket 1106 more than any other part of the event augment 1104, this is interpreted to have a result of adding the user (or users for a group) associated with the person augment to the invite list. Event augment 1104 is also configured to send a notification of the event to a person associated with an augment when that augment is dropped on the event without overlapping the socket 1106. In example 1100, person augment 1102 has been dropped such that person augment 1102 is touching the socket 1106 more than any other part of the event augment 1104. Thus, person augment 1102 is added to the invite list instead of sending a notification of the event to the user associated with person augment 1102.

Figure 11B:
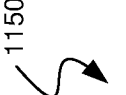
FIG. 11B is a conceptual diagram illustrating an example of disambiguation of augment combinations with multiple possible results based on providing user options.
Figure 11B:
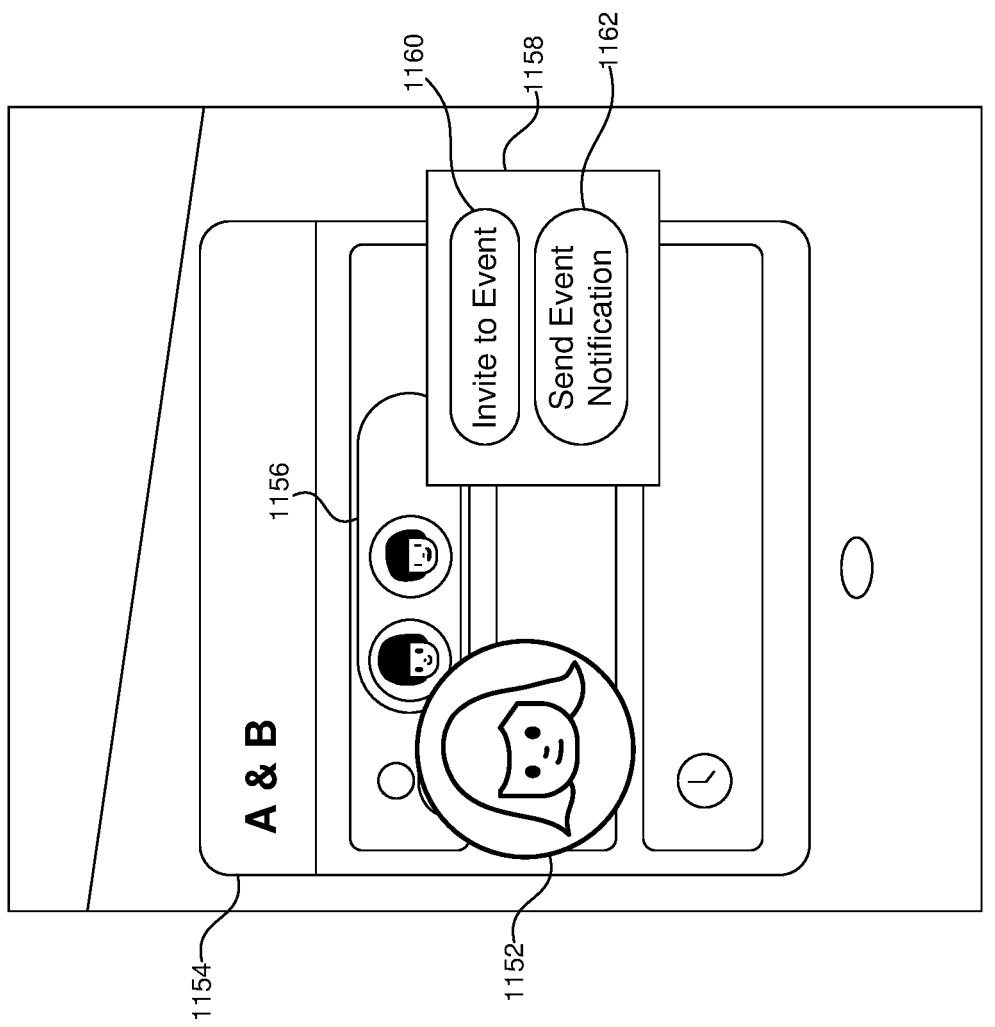

FIG. 11B is a conceptual diagram illustrating an example 1150 of disambiguation of for augment combinations with multiple possible results based on providing user options. In example 1150, a user is again attempting to add a person to an event by dropping the person augment 1152 onto the event augment 1154. In example 1150, event augment 1154 has a user invite list which has been setup as a socket 1156. Socket 1156 is configured such that, when a person-type augment is dropped onto event augment 1154 in a manner where the person augment is touching the socket 1156 more than any other part of the event augment 1154, this is interpreted to have a result of adding the user (or users for a group) associated with the person augment to the invite list. Event augment 1154 is also configured to send a notification of the event to a person associated with an augment when that augment is dropped on the event without overlapping the socket 1156. In example 1150, however, person augment 1152 has been dropped such that person augment 1152 is touching the socket 1156, but not more than any other part of the event augment 1154. Thus, the user's intended action is unclear. To disambiguate the user's intent, the artificial reality system presents dialog 1158 with options 1160 ("Invite to Event") and 1162 ("Send Event Notification"). The user can make a selection in the dialog 1158, and the artificial reality system will choose the corresponding action result.

Figure 12B:
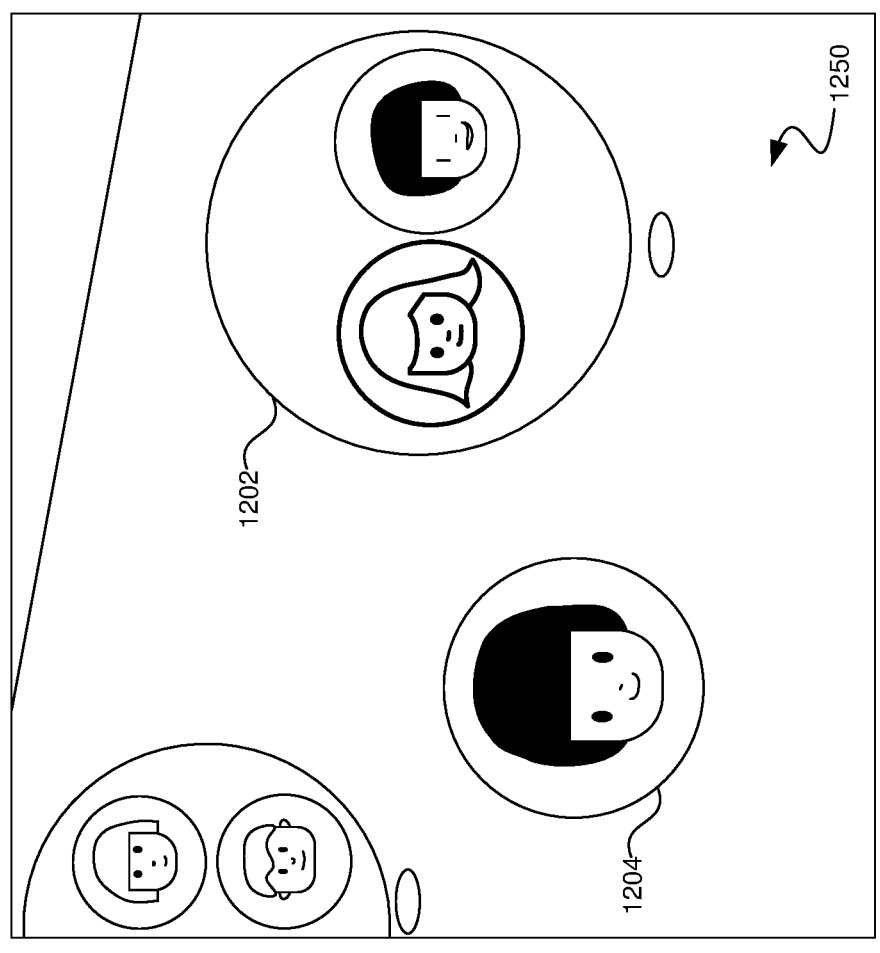
FIGS. 12A and 12B are conceptual diagrams illustrating an example of peeling an augment out of a combination.
Figure 12B:
Figure 12A:
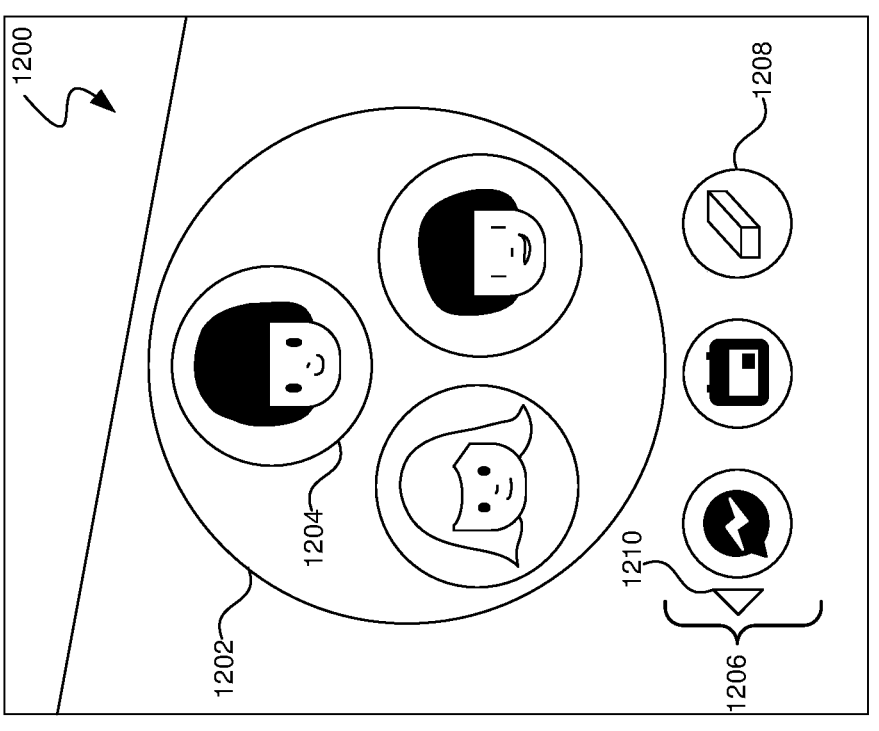

FIGS. 12A and 12B are conceptual diagrams illustrating an example spanning 1200 and 1250 of peeling an augment out of a combination. Starting with 1220 in FIG. 12A, a user wishes to peel person augment 1204 from group 1202 (i.e., remove person augment 1204 from group 1202 without leaving a copy in group 1202). To indicate this, the user selects tool 1208 from tools 1206. In example 1200, tools 1206 are in a carousel format, meaning that the user can scroll the tolls 1206 to see the other tools in the set of tools, as indicated by arrow 1210. After selecting peel tool 1208, the user reaches into the group 1202 and performs a "grab" gesture on person augment 1204 and pulls it out of the group 1202, as shown in 1250 of FIG. 12B. As further illustrated in 1250 of FIG. 12B, after the person augment 1204 is pulled out of the group 1202, group 1202 no longer has a copy of the person augment 1204.

Figure 13A:
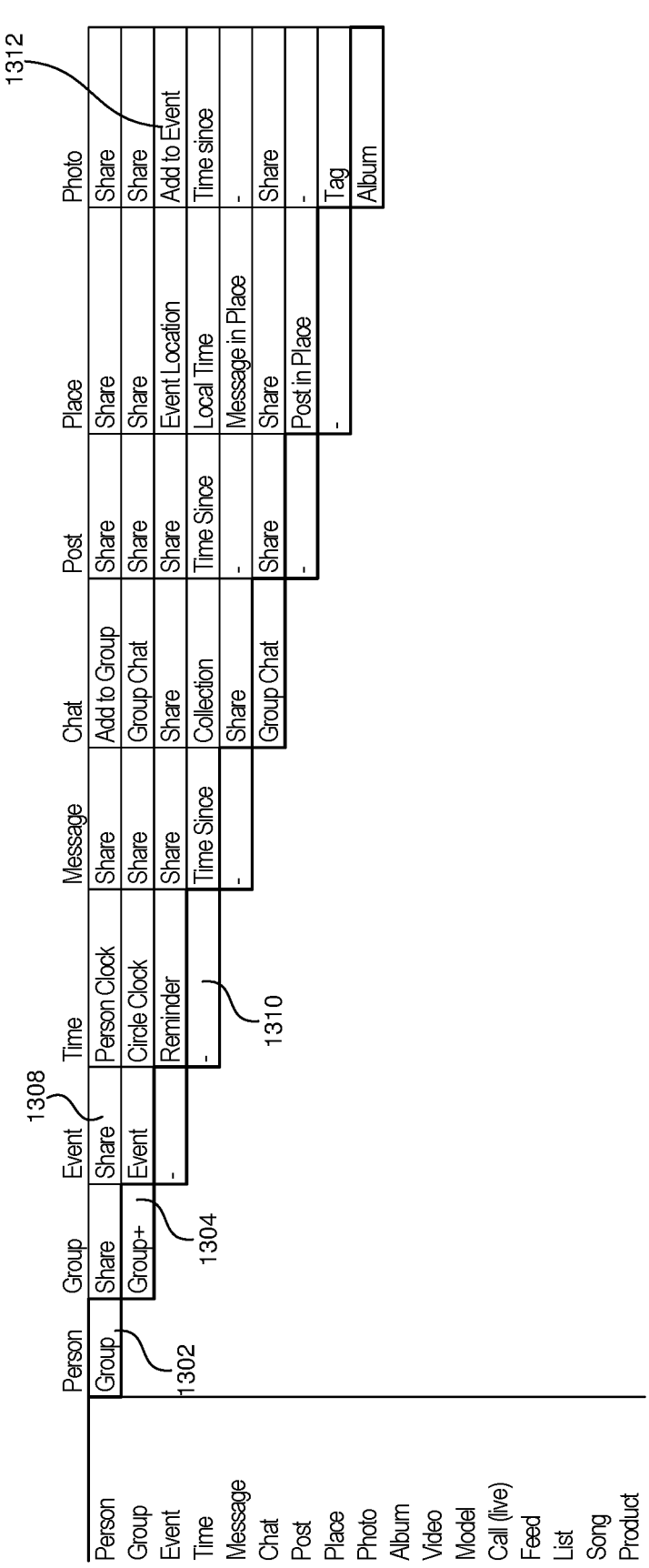

FIGS. 13A and 13B are conceptual diagrams each illustrating half of a table 1300 cross-referencing augment types to specify a resulting type or action when augments are linked. Table 1300 includes a row and columns labeled with examples of augment types and each cell (row and column) in table 1300 provides the result that is used when an augment of the type labeled for that row is linked with an augment of the type labeled for that column. Table 1300 is a two-dimensional table, however in other implementations the cross-reference data structure can be an n-dimensional data structure, providing results for simultaneous combination of n types of augments. In example table 1300, the augment types are person, group, event, time, message, chat, (social media) post, place, photo, album, video, model, call, feed, list, song, and product. However, other augment types are contemplated.

As examples, when a person type augment is linked to another person type augment, the cross reference is cell 1302, indicating the result is a group augment; when a group type augment is linked to another group type augment, the cross reference is cell 1304, indicating the result is an action of combining the groups (as indicated by the + symbol); when a event type augment is linked to a person type augment, the cross reference is cell 1308, indicating the result is an action of sharing the event corresponding to the event augment with the person corresponding to the person augment; when an attempt is made to link a time type augment with another time type augment, the cross reference is cell 1310 without a value, indicating the result is for the linking to fail; and when a photo type augment is linked to an event type augment, the cross reference is cell 1312, indicating the result is to add the photo as a background photo for the event. Continuing to 1350 in FIG. 13B, when a video type augment is linked to another video type augment, the cross reference is cell 1352, indicating the result is a playlist augment; when a model type augment is linked to another model type augment, the cross reference is cell 1354, indicating the result is a scene augment; when a call type augment is linked to a group type augment, the cross reference is cell 1356, indicating the result is the action of adding the people corresponding to the group to the call; when a product type augment is linked to a place type augment, the cross reference is cell 1358, indicating the result is to specify in the product that it is linked to the place; when a song type augment is linked to another song type augment, the cross reference is cell 1362, indicating the result is a product playlist type augment where the playlist type augment is associated with a playlist that, as a result of the linking, includes the songs associated with the two song augments; and when a product type augment is linked to another product type augment, the cross reference is cell 1360, indicating the result is a product list type augment.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A computer-readable storage medium storing instructions that, when executed by a computing system, cause the computing system to perform a process for unlinking virtual objects in a 3D artificial reality environment, wherein the 3D artificial reality environment orchestrates interactions between a plurality of virtual objects, the process comprising:

receiving a selection, of one or more extraction virtual objects, from within a collection virtual object that represents multiple virtual objects including the one or more extraction virtual objects;

when a removal indication has been provided in relation to the selection, causing a version of the one or more extraction virtual objects to be in the 3D artificial reality environment and causing the collection virtual object to no longer represent the one or more extraction virtual objects; and when no removal indication has been provided in relation to the selection, causing the version of the one or more extraction virtual objects to be in the 3D artificial reality environment while the collection virtual object continues to represent the one or more extraction virtual objects.

2. The computer-readable storage medium of claim 1, wherein the collection virtual object was created in response to an indication, from a user, to link a first virtual object and a second virtual object, wherein the indication was received by an XR device recognizing a user gesture comprising the user causing a 3D volume of the first virtual object to intersect with a 3D volume of the second virtual object.

3. The computer-readable storage medium of claim 1, wherein the removal indication was provided through a user interaction with one or more virtual UI tools displayed in relation to the collection virtual object.

4. The computer-readable storage medium of claim 1, wherein the removal indication has been provided causing the version of the one or more extraction virtual objects to be in the 3D artificial reality environment and causing the collection virtual object to no longer represent the one or more extraction virtual objects.

5. The computer-readable storage medium of claim 1, wherein the removal indication has not been provided causing the version of the one or more extraction virtual objects to be in the 3D artificial reality environment while the collection virtual object continues to represent the one or more extraction virtual objects.

6. A computing system for unlinking virtual objects in a 3D artificial reality environment, wherein the 3D artificial reality environment orchestrates interactions between a plurality of virtual objects, the computing system comprising:

one or more processors; and one or more memories storing instructions that, when executed by the one or more processors, cause the computing system to perform a process comprising:

receiving a selection, of one or more extraction virtual objects, from within a collection virtual object that represents multiple virtual objects including the one or more extraction virtual objects;

when a removal indication has been provided in relation to the selection, causing a version of the one or more extraction virtual objects to be in the 3D artificial reality environment and causing the collection virtual object to no longer represent the one or more extraction virtual objects; and when no removal indication has been provided in relation to the selection, causing the version of the one or more extraction virtual objects to be in the 3D artificial reality environment while the collection virtual object continues to represent the one or more extraction virtual objects.

7. The computing system of claim 6, wherein the removal indication has been provided causing the version of the one or more extraction virtual objects to be in the 3D artificial reality environment and causing the collection virtual object to no longer represent the one or more extraction virtual objects.

8. The computing system of claim 6, wherein the removal indication has not been provided causing the version of the one or more extraction virtual objects to be in the 3D artificial reality environment while the collection virtual object continues to represent the one or more extraction virtual objects.

9. A method for performing real-world device coordination actions based on virtual objects, in a 3D artificial reality environment, the method comprising:

creating one or more links between two or more virtual objects, wherein at least a first virtual object, of the two or more virtual objects, is associated with a real-world device, and wherein a first at least one link, of the one or more links, is based on matching of a property type between the linked virtual objects;

invoking a rule that grants access to one or more operational states of the real-world device, wherein the access is granted to at least a second virtual object, of the two or more virtual objects, linked to the first of the two or more virtual objects, and wherein the granting access uses a second at least one link, of the one or more links; and effecting an event, using a third at least one link, of the one or more links, that coordinates actions between A) at least a third virtual object, of the two or more virtual objects, linked to the first virtual object, and B) the real-world device.

10. The method of claim 9, wherein the real-world device is a video output device and at least one of the one or more operational states of the real-world device is a play state of the video output device.

11. The method of claim 9, wherein the third virtual object corresponds to a scheduled event.

12. The method of claim 9, wherein the second virtual object is a virtual object with a virtual display screen and the real-world device is a smart TV.

13. The method of claim 12, wherein, when a play state of the smart TV indicates video is playing, the method further comprises causing a smart lamp to dim lighting or set lighting coloring to match coloring of output of the smart TV.

14. The method of claim 9, wherein, in response to creating the first at least one link, the first virtual object further connects to one or more additional devices and controls an operational state of the one or more additional devices based on an operational state of a second real-world device.

15. The method of claim 9, wherein the second virtual object and the third virtual object are the same virtual object.

16. The method of claim 9, wherein two or more of A) the first at least one link, B) the second at least one link, or C) the third at least one link, are the same at least one link.

17. The method of claim 9, wherein the third one or more links allows user manipulation of the third virtual object to access or set a property of the second virtual object.

18. The method of claim 9, wherein the third virtual object is a virtual object for a video.

19. The method of claim 9, wherein effecting the event coordinates actions between multiple remote users.

20. The method of claim 9, wherein the creating the first one or more links is performed in response to a user causing an intersection between a volume of a first virtual object and a volume of a second virtual object.

* * * * *